United States Patent
Mirchandani et al.

(10) Patent No.: US 8,318,063 B2
(45) Date of Patent: Nov. 27, 2012

(54) INJECTION MOLDING FABRICATION METHOD

(75) Inventors: Prakash K. Mirchandani, Hampton Cove, AL (US); David J. Wills, Brentwood, TN (US); Michale E. Waller, Huntsville, AL (US); Jeffrey L. Weigold, Huntsville, AL (US); Billy D. Swearengin, New Hope, AL (US)

(73) Assignee: TDY Industries, LLC, Pittsburgh, PA (US)

( * ) Notice: Subject to any disclaimer, the term of this patent is extended or adjusted under 35 U.S.C. 154(b) by 328 days.

(21) Appl. No.: 11/585,408

(22) Filed: Oct. 24, 2006

(65) Prior Publication Data

US 2007/0108650 A1    May 17, 2007

Related U.S. Application Data

(63) Continuation-in-part of application No. 11/167,811, filed on Jun. 27, 2005.

(51) Int. Cl.
*B22F 7/02* (2006.01)
(52) U.S. Cl. ......... 264/125; 264/109; 264/119; 264/320
(58) Field of Classification Search ........... 264/119, 264/125, 293, 320, 109
See application file for complete search history.

(56) References Cited

U.S. PATENT DOCUMENTS

| | | | |
|---|---|---|---|
| 1,509,438 A | 9/1924 | Miller | |
| 1,530,293 A | 3/1925 | Breitenstein | |
| 1,808,138 A | 6/1931 | Hogg et al. | |
| 1,811,802 A | 6/1931 | Newman | |
| 1,912,298 A | 5/1933 | Newman | |
| 2,054,028 A | 9/1936 | Benninghoff | |
| 2,093,507 A | 9/1937 | Bartek | |
| 2,093,743 A | 9/1937 | Staples | |
| 2,093,986 A | 9/1937 | Staples | |
| 2,240,840 A | 5/1941 | Fischer | |
| 2,246,237 A | 6/1941 | Benninghoff | |
| 2,283,280 A | 5/1942 | Nell | |
| 2,351,827 A | 6/1944 | McAllister | |
| 2,422,994 A * | 6/1947 | Taylor | 408/59 |

(Continued)

FOREIGN PATENT DOCUMENTS

AU    695583    2/1998

(Continued)

OTHER PUBLICATIONS

International Search Report, International Application No. PCT/US2006/023238, dated Mar. 22, 2007, (7 pages).

(Continued)

*Primary Examiner* — Joseph Del Sole
*Assistant Examiner* — Timothy Kennedy
(74) *Attorney, Agent, or Firm* — K & L Gates LLP; Patrick J. Viccaro; John E. Grosselin, III

(57) ABSTRACT

A method of forming a composite article by injecting at least two composite materials comprising metal carbides into a mold to form a green compact is disclosed. The composite materials may be metal powders comprising a binder metal, a hard particle. The composite material may further comprise a plastic binder. The two different composite materials are injected into the mold to form the green compact. Additionally, the composite materials may be injected through a die before entering the mold. In a specific embodiment, the die forms at least one internal channel within the green compact.

39 Claims, 16 Drawing Sheets

U.S. PATENT DOCUMENTS

| | | | |
|---|---|---|---|
| 2,819,958 A | 1/1958 | Abkowitz et al. | |
| 2,819,959 A | 1/1958 | Abkowitz et al. | |
| 2,906,654 A | 9/1959 | Abkowitz | |
| 2,954,570 A | 10/1960 | Couch | |
| 3,041,641 A | 7/1962 | Hradek et al. | |
| 3,093,850 A | 6/1963 | Kelso | |
| 3,368,881 A | 2/1968 | Abkowitz et al. | |
| 2,299,207 A | 10/1969 | Bevillard | |
| 3,471,921 A | 10/1969 | Feenstra | |
| 3,482,295 A | 12/1969 | Trent | |
| 3,490,901 A | 1/1970 | Hachisuka et al. | |
| 3,581,835 A | 6/1971 | Stebley | |
| 3,629,887 A | 12/1971 | Urbanic | |
| 3,660,050 A | 5/1972 | Iler et al. | |
| 3,757,879 A | 9/1973 | Wilder et al. | |
| 3,776,655 A | 12/1973 | Urbanic | |
| 3,782,848 A | 1/1974 | Pfeifer | |
| 3,812,548 A | 5/1974 | Theuerkaue | |
| 3,889,516 A | 6/1975 | Yankee et al. | |
| RE28,645 E | 12/1975 | Aoki et al. | |
| 3,942,954 A | 3/1976 | Frehn | |
| 3,987,859 A | 10/1976 | Lichte | |
| 4,009,027 A | 2/1977 | Naidich et al. | |
| 4,017,480 A | 4/1977 | Baum | |
| 4,047,828 A | 9/1977 | Makely | |
| 4,094,709 A | 6/1978 | Rozmus | |
| 4,097,180 A | 6/1978 | Kwieraga | |
| 4,097,275 A | 6/1978 | Horvath | |
| 4,106,382 A | 8/1978 | Salje et al. | |
| 4,126,652 A | 11/1978 | Oohara et al. | |
| 4,128,136 A | 12/1978 | Generoux | |
| 4,170,499 A | 10/1979 | Thomas et al. | |
| 4,198,233 A | 4/1980 | Frehn | |
| 4,221,270 A | 9/1980 | Vezirian | |
| 4,229,638 A | 10/1980 | Lichte | |
| 4,233,720 A | 11/1980 | Rozmus | |
| 4,255,165 A | 3/1981 | Dennis et al. | |
| 4,270,952 A | 6/1981 | Kobayashi | |
| 4,276,788 A | 7/1981 | van Nederveen | |
| 4,277,106 A | 7/1981 | Sahley | |
| 4,306,139 A | 12/1981 | Shinozaki et al. | |
| 4,311,490 A | 1/1982 | Bovenkerk et al. | |
| 4,325,994 A | 4/1982 | Kitashima et al. | |
| 4,327,156 A | 4/1982 | Dillon et al. | |
| 4,340,327 A | 7/1982 | Martins | |
| 4,341,557 A | 7/1982 | Lizenby | |
| 4,351,401 A | 9/1982 | Fielder | |
| 4,376,793 A | 3/1983 | Jackson | |
| 4,389,952 A | 6/1983 | Dreier et al. | |
| 4,396,321 A | 8/1983 | Holmes | |
| 4,398,952 A | 8/1983 | Drake | |
| 4,423,646 A | 1/1984 | Berhardt | |
| 4,478,297 A | 10/1984 | Radtke | |
| 4,499,048 A | 2/1985 | Hanejko | |
| 4,499,795 A | 2/1985 | Radtke | |
| 4,520,882 A | 6/1985 | van Nederveen | |
| 4,526,748 A | 7/1985 | Rozmus | |
| 4,547,104 A | 10/1985 | Holmes | |
| 4,547,337 A | 10/1985 | Rozmus | |
| 4,550,532 A | 11/1985 | Fletcher, Jr. et al. | |
| 4,552,232 A | 11/1985 | Frear | |
| 4,553,615 A | 11/1985 | Grainger | |
| 4,554,130 A | 11/1985 | Ecer | |
| 4,562,990 A | 1/1986 | Rose | |
| 4,574,011 A | 3/1986 | Bonjour et al. | |
| 4,579,713 A | 4/1986 | Lueth | |
| 4,587,174 A | 5/1986 | Yoshimura et al. | |
| 4,592,685 A | 6/1986 | Beere | |
| 4,596,694 A | 6/1986 | Rozmus | |
| 4,597,730 A | 7/1986 | Rozmus | |
| 4,604,106 A | 8/1986 | Hall | |
| 4,605,343 A | 8/1986 | Hibbs, Jr. et al. | |
| 4,609,577 A | 9/1986 | Long | |
| 4,630,693 A | 12/1986 | Goodfellow | |
| 4,642,003 A | 2/1987 | Yoshimura | |
| 4,649,086 A | 3/1987 | Johnson | |
| 4,656,002 A | 4/1987 | Lizenby et al. | |
| 4,662,461 A | 5/1987 | Garrett | |
| 4,667,756 A | 5/1987 | King et al. | |
| 4,686,080 A | 8/1987 | Hara et al. | |
| 4,686,156 A | 8/1987 | Baldoni, II et al. | |
| 4,694,919 A | 9/1987 | Barr | |
| 4,708,542 A | 11/1987 | Emanuelli | |
| 4,722,405 A | 2/1988 | Langford | |
| 4,729,789 A | 3/1988 | Ide et al. | |
| 4,743,515 A | 5/1988 | Fischer et al. | |
| 4,744,943 A | 5/1988 | Timm | |
| 4,749,053 A | 6/1988 | Hollingshead | |
| 4,752,159 A | 6/1988 | Howlett | |
| 4,752,164 A | 6/1988 | Leonard, Jr. | |
| 4,761,844 A | 8/1988 | Turchan | |
| 4,779,440 A * | 10/1988 | Cleve et al. | 72/260 |
| 4,780,274 A | 10/1988 | Barr | |
| 4,804,049 A | 2/1989 | Barr | |
| 4,809,903 A | 3/1989 | Eylon et al. | |
| 4,813,823 A | 3/1989 | Bieneck | |
| 4,831,674 A | 5/1989 | Bergstrom et al. | |
| 4,838,366 A | 6/1989 | Jones | |
| 4,861,350 A | 8/1989 | Phaal et al. | |
| 4,871,377 A | 10/1989 | Frushour | |
| 4,881,431 A | 11/1989 | Bieneck | |
| 4,884,477 A | 12/1989 | Smith et al. | |
| 4,889,017 A | 12/1989 | Fuller et al. | |
| 4,899,838 A | 2/1990 | Sullivan et al. | |
| 4,919,013 A | 4/1990 | Smith et al. | |
| 4,923,512 A | 5/1990 | Timm et al. | |
| 4,934,040 A | 6/1990 | Turchan | |
| 4,943,191 A | 7/1990 | Schmidtt | |
| 4,956,012 A | 9/1990 | Jacobs et al. | |
| 4,968,348 A | 11/1990 | Abkowitz et al. | |
| 4,971,485 A | 11/1990 | Nomura et al. | |
| 4,991,670 A | 2/1991 | Fuller et al. | |
| 5,000,273 A | 3/1991 | Horton et al. | |
| 5,010,945 A | 4/1991 | Burke | |
| 5,030,598 A | 7/1991 | Hsieh | |
| 5,032,352 A | 7/1991 | Meeks et al. | |
| 5,041,261 A | 8/1991 | Buljan et al. | |
| 5,049,450 A | 9/1991 | Dorfman et al. | |
| RE33,753 E | 11/1991 | Vacchiano et al. | |
| 5,067,860 A | 11/1991 | Kobayashi et al. | |
| 5,080,538 A | 1/1992 | Schmidtt | |
| 5,090,491 A | 2/1992 | Tibbitts et al. | |
| 5,092,412 A | 3/1992 | Walk | |
| 5,094,571 A | 3/1992 | Ekerot | |
| 5,098,232 A | 3/1992 | Benson | |
| 5,110,687 A | 5/1992 | Abe et al. | |
| 5,112,162 A | 5/1992 | Hartford et al. | |
| 5,112,168 A | 5/1992 | Glimpel | |
| 5,116,659 A * | 5/1992 | Glatzle et al. | 428/188 |
| 5,126,206 A | 6/1992 | Garg et al. | |
| 5,127,776 A | 7/1992 | Glimpel | |
| 5,161,898 A | 11/1992 | Drake | |
| 5,174,700 A | 12/1992 | Sgarbi et al. | |
| 5,179,772 A | 1/1993 | Braun et al. | |
| 5,186,739 A | 2/1993 | Isobe et al. | |
| 5,203,513 A | 4/1993 | Keller et al. | |
| 5,203,932 A | 4/1993 | Kato et al. | |
| 5,232,522 A | 8/1993 | Doktycz et al. | |
| 5,266,415 A | 11/1993 | Newkirk et al. | |
| 5,273,380 A | 12/1993 | Musacchia | |
| 5,281,260 A | 1/1994 | Kumar et al. | |
| 5,286,685 A | 2/1994 | Schoennahl et al. | |
| 5,305,840 A | 4/1994 | Liang et al. | |
| 5,311,958 A | 5/1994 | Isbell et al. | |
| 5,326,196 A | 7/1994 | Noll | |
| 5,333,520 A | 8/1994 | Fischer et al. | |
| 5,338,135 A | 8/1994 | Noguchi et al. | |
| 5,348,806 A | 9/1994 | Kojo et al. | |
| 5,354,155 A | 10/1994 | Adams | |
| 5,359,772 A | 11/1994 | Carlsson et al. | |
| 5,373,907 A | 12/1994 | Weaver | |
| 5,376,329 A | 12/1994 | Morgan et al. | |
| 5,413,438 A | 5/1995 | Turchan | |
| 5,423,899 A | 6/1995 | Krall et al. | |
| 5,429,459 A | 7/1995 | Palm | |
| 5,433,280 A | 7/1995 | Smith | |
| 5,438,858 A | 8/1995 | Friedrichs | |

| Patent | Date | Name | | Patent | Date | Name |
|---|---|---|---|---|---|---|
| 5,443,337 A | 8/1995 | Katayama | | 5,988,953 A | 11/1999 | Berglund et al. |
| 5,452,771 A | 9/1995 | Blackman et al. | | 6,007,909 A | 12/1999 | Rolander et al. |
| 5,467,669 A | 11/1995 | Stroud | | 6,012,882 A | 1/2000 | Turchan |
| 5,474,407 A | 12/1995 | Rodel et al. | | 6,022,175 A | 2/2000 | Heinrich et al. |
| 5,479,997 A | 1/1996 | Scott et al. | | 6,029,544 A | 2/2000 | Katayama |
| 5,480,272 A | 1/1996 | Jorgensen et al. | | 6,051,171 A | 4/2000 | Takeuchi et al. |
| 5,482,670 A | 1/1996 | Hong | | 6,063,333 A | 5/2000 | Dennis |
| 5,484,468 A | 1/1996 | Ostlund et al. | | 6,068,070 A | 5/2000 | Scott |
| 5,487,626 A | 1/1996 | Von Holst et al. | | 6,073,518 A | 6/2000 | Chow et al. |
| 5,496,137 A | 3/1996 | Ochayon et al. | | 6,076,999 A | 6/2000 | Hedberg et al. |
| 5,505,748 A | 4/1996 | Tank et al. | | 6,086,003 A | 7/2000 | Gunter et al. |
| 5,506,055 A | 4/1996 | Dorfman et al. | | 6,086,980 A | 7/2000 | Foster et al. |
| 5,518,077 A | 5/1996 | Blackman et al. | | 6,089,123 A | 7/2000 | Chow et al. |
| 5,525,134 A | 6/1996 | Mehrotra et al. | | 6,109,377 A | 8/2000 | Massa et al. |
| 5,541,006 A | 7/1996 | Conley | | 6,109,677 A | 8/2000 | Anthony |
| 5,543,235 A | 8/1996 | Mirchandani et al. | | 6,135,218 A | 10/2000 | Deane et al. |
| 5,544,550 A | 8/1996 | Smith | | 6,148,936 A | 11/2000 | Evans et al. |
| 5,560,440 A | 10/1996 | Tibbitts | | 6,200,514 B1 | 3/2001 | Meister |
| 5,570,978 A | 11/1996 | Rees et al. | | 6,209,420 B1 | 4/2001 | Butcher et al. |
| 5,580,666 A * | 12/1996 | Dubensky et al. ............ 428/552 | | 6,214,134 B1 | 4/2001 | Eylon et al. |
| 5,586,612 A | 12/1996 | Isbell et al. | | 6,214,287 B1 | 4/2001 | Waldenström |
| 5,590,729 A | 1/1997 | Cooley et al. | | 6,217,992 B1 | 4/2001 | Grab |
| 5,593,474 A | 1/1997 | Keshavan et al. | | 6,220,117 B1 | 4/2001 | Butcher |
| 5,601,857 A * | 2/1997 | Friedrichs ..................... 425/381 | | 6,227,188 B1 | 5/2001 | Tankala et al. |
| 5,603,075 A | 2/1997 | Stoll et al. | | 6,228,139 B1 | 5/2001 | Oskarsson |
| 5,609,447 A | 3/1997 | Britzke et al. | | 6,241,036 B1 | 6/2001 | Lovato et al. |
| 5,611,251 A | 3/1997 | Katayama | | 6,248,277 B1 * | 6/2001 | Friedrichs ..................... 264/167 |
| 5,612,264 A | 3/1997 | Nilsson et al. | | 6,254,658 B1 | 7/2001 | Taniuchi et al. |
| 5,628,837 A | 5/1997 | Britzke et al. | | 6,287,360 B1 | 9/2001 | Kembaiyan et al. |
| RE35,538 E | 6/1997 | Akesson et al. | | 6,290,438 B1 | 9/2001 | Papajewski |
| 5,635,247 A | 6/1997 | Ruppi | | 6,293,986 B1 | 9/2001 | Rödiger et al. |
| 5,641,251 A | 6/1997 | Leins et al. | | 6,299,658 B1 | 10/2001 | Moriguchi et al. |
| 5,641,921 A | 6/1997 | Dennis et al. | | 6,302,224 B1 | 10/2001 | Sherwood, Jr. |
| 5,662,183 A | 9/1997 | Fang | | 6,345,941 B1 | 2/2002 | Fang et al. |
| 5,665,431 A | 9/1997 | Narasimhan | | 6,353,771 B1 | 3/2002 | Southland |
| 5,666,864 A | 9/1997 | Tibbitts | | 6,372,346 B1 | 4/2002 | Toth |
| 5,677,042 A | 10/1997 | Massa et al. | | 6,374,932 B1 | 4/2002 | Brady |
| 5,679,445 A | 10/1997 | Massa et al. | | 6,375,706 B2 | 4/2002 | Kembaiyan et al. |
| 5,686,119 A | 11/1997 | McNaughton, Jr. | | 6,386,954 B2 | 5/2002 | Sawabe et al. |
| 5,697,042 A | 12/1997 | Massa et al. | | 6,395,108 B2 | 5/2002 | Eberle et al. |
| 5,697,046 A | 12/1997 | Conley | | 6,402,439 B1 | 6/2002 | Puide et al. |
| 5,697,462 A | 12/1997 | Grimes et al. | | 6,425,716 B1 | 7/2002 | Cook |
| 5,704,736 A | 1/1998 | Giannetti | | 6,450,739 B1 | 9/2002 | Puide et al. |
| 5,718,948 A | 2/1998 | Ederyd et al. | | 6,453,899 B1 | 9/2002 | Tselesin |
| 5,732,783 A | 3/1998 | Truax et al. | | 6,454,025 B1 | 9/2002 | Runquist et al. |
| 5,733,078 A | 3/1998 | Matsushita et al. | | 6,454,028 B1 | 9/2002 | Evans |
| 5,733,649 A | 3/1998 | Kelley et al. | | 6,454,030 B1 | 9/2002 | Findley et al. |
| 5,733,664 A | 3/1998 | Kelley et al. | | 6,458,471 B2 | 10/2002 | Lovato et al. |
| 5,750,247 A | 5/1998 | Bryant et al. | | 6,461,401 B1 | 10/2002 | Kembaiyan et al. |
| 5,753,160 A | 5/1998 | Takeuchi et al. | | 6,474,425 B1 | 11/2002 | Truax et al. |
| 5,755,033 A | 5/1998 | Gunter et al. | | 6,499,917 B1 | 12/2002 | Parker et al. |
| 5,755,298 A | 5/1998 | Langford, Jr. et al. | | 6,499,920 B2 | 12/2002 | Sawabe |
| 5,762,843 A | 6/1998 | Massa et al. | | 6,500,226 B1 | 12/2002 | Dennis |
| 5,765,095 A | 6/1998 | Flak et al. | | 6,502,623 B1 | 1/2003 | Schmitt |
| 5,776,593 A | 7/1998 | Massa et al. | | 6,511,265 B1 | 1/2003 | Mirchandani et al. |
| 5,778,301 A | 7/1998 | Hong | | 6,544,308 B2 | 4/2003 | Griffin et al. |
| 5,789,686 A | 8/1998 | Massa et al. | | 6,546,991 B2 | 4/2003 | Dworog et al. |
| 5,791,833 A | 8/1998 | Niebauer | | 6,551,035 B1 | 4/2003 | Bruhn et al. |
| 5,792,403 A | 8/1998 | Massa et al. | | 7,703,555 B2 | 4/2003 | Overstreet |
| 5,803,152 A | 9/1998 | Dolman et al. | | 6,562,462 B2 | 5/2003 | Griffin et al. |
| 5,806,934 A | 9/1998 | Massa et al. | | 6,576,182 B1 | 6/2003 | Ravagni et al. |
| 5,830,256 A | 11/1998 | Northrop et al. | | 6,585,064 B2 | 7/2003 | Griffin et al. |
| 5,851,094 A | 12/1998 | Stand et al. | | 6,589,640 B2 | 7/2003 | Griffin et al. |
| 5,856,626 A | 1/1999 | Fischer et al. | | 6,599,467 B1 | 7/2003 | Yamaguchi et al. |
| 5,863,640 A | 1/1999 | Ljungberg et al. | | 6,607,693 B1 | 8/2003 | Saito et al. |
| 5,865,571 A | 2/1999 | Tankala et al. | | 6,607,835 B2 | 8/2003 | Fang et al. |
| 5,873,684 A | 2/1999 | Flolo | | 6,620,375 B1 | 9/2003 | Tank et al. |
| 5,880,382 A | 3/1999 | Fang et al. | | 6,638,609 B2 | 10/2003 | Nordgren et al. |
| 5,890,852 A | 4/1999 | Gress | | 6,651,757 B2 | 11/2003 | Belnap et al. |
| 5,893,204 A | 4/1999 | Symonds | | 6,655,481 B2 | 12/2003 | Findley et al. |
| 5,897,830 A | 4/1999 | Abkowitz et al. | | 6,655,882 B2 | 12/2003 | Heinrich et al. |
| 5,899,257 A | 5/1999 | Alleweireldt et al. | | 6,676,863 B2 | 1/2004 | Christiaens et al. |
| 5,947,660 A * | 9/1999 | Karlsson et al. .............. 408/230 | | 6,685,880 B2 | 2/2004 | Engström et al. |
| 5,957,006 A | 9/1999 | Smith | | 6,688,988 B2 | 2/2004 | McClure |
| 5,963,775 A | 10/1999 | Fang | | 6,695,551 B2 | 2/2004 | Silver |
| 5,964,555 A | 10/1999 | Strand | | 6,706,327 B2 | 3/2004 | Blomstedt et al. |
| 5,967,249 A | 10/1999 | Butcher | | 6,716,388 B2 * | 4/2004 | Bruhn et al. ..................... 419/5 |
| 5,971,670 A | 10/1999 | Pantzar et al. | | 6,719,074 B2 | 4/2004 | Tsuda et al. |
| 5,976,707 A | 11/1999 | Grab et al. | | 6,737,178 B2 | 5/2004 | Ota et al. |

| | | | | | | |
|---|---|---|---|---|---|---|
| 6,742,608 | B2 | 6/2004 | Murdoch | 2006/0016521 A1 | 1/2006 | Hanusiak et al. |
| 6,742,611 | B1 | 6/2004 | Illerhaus et al. | 2006/0027046 A1* | 2/2006 | Kugelberg et al. .......... 76/108.6 |
| 6,756,009 | B2 | 6/2004 | Sim et al. | 2006/0032677 A1 | 2/2006 | Azar et al. |
| 6,764,555 | B2 | 7/2004 | Hiramatsu et al. | 2006/0043648 A1 | 3/2006 | Takeuchi et al. |
| 6,766,870 | B2 | 7/2004 | Overstreet | 2006/0060392 A1 | 3/2006 | Eyre |
| 6,767,505 | B2 | 7/2004 | Witherspoon et al. | 2006/0286410 A1 | 12/2006 | Ahigren et al. |
| 6,782,958 | B2 | 8/2004 | Liang et al. | 2006/0288820 A1 | 12/2006 | Mirchandani et al. |
| 6,799,648 | B2 | 10/2004 | Brandenberg et al. | 2007/0082229 A1 | 4/2007 | Mirchandani et al. |
| 6,808,821 | B2 | 10/2004 | Fujita et al. | 2007/0102198 A1 | 5/2007 | Oxford et al. |
| 6,844,085 | B2 | 1/2005 | Takayama et al. | 2007/0102199 A1 | 5/2007 | Smith et al. |
| 6,848,521 | B2 | 2/2005 | Lockstedt et al. | 2007/0102200 A1 | 5/2007 | Choe et al. |
| 6,849,231 | B2 | 2/2005 | Kojima et al. | 2007/0102202 A1 | 5/2007 | Choe et al. |
| 6,892,793 | B2 | 5/2005 | Liu et al. | 2007/0126334 A1 | 6/2007 | Nakamura et al. |
| 6,899,495 | B2 | 5/2005 | Hansson et al. | 2007/0163679 A1 | 7/2007 | Fujisawa et al. |
| 6,918,942 | B2 | 7/2005 | Hatta et al. | 2007/0193782 A1 | 8/2007 | Fang et al. |
| 6,948,890 | B2 | 9/2005 | Svensson et al. | 2007/0251732 A1 | 11/2007 | Mirchandani et al. |
| 6,949,148 | B2 | 9/2005 | Sugiyama et al. | 2008/0011519 A1 | 1/2008 | Smith et al. |
| 6,955,233 | B2 | 10/2005 | Crowe et al. | 2008/0101977 A1 | 5/2008 | Eason et al. |
| 6,958,099 | B2 | 10/2005 | Nakamura et al. | 2008/0145686 A1 | 6/2008 | Michandani et al. |
| 7,014,719 | B2 | 3/2006 | Suzuki et al. | 2008/0163723 A1 | 7/2008 | Michandani et al. |
| 7,014,720 | B2 | 3/2006 | Iseda | 2008/0196318 A1 | 8/2008 | Bost et al. |
| 7,044,243 | B2 | 5/2006 | Kembaiyan et al. | 2008/0302576 A1 | 12/2008 | Michandani et al. |
| 7,048,081 | B2 | 5/2006 | Smith et al. | 2009/0041612 A1 | 2/2009 | Fang et al. |
| 7,070,666 | B2 | 7/2006 | Druschitz et al. | 2009/0136308 A1 | 5/2009 | Newitt |
| 7,090,731 | B2 | 8/2006 | Kashima et al. | 2009/0180915 A1 | 7/2009 | Mirchandani et al. |
| 7,101,128 | B2 | 9/2006 | Hansson | 2009/0293672 A1 | 12/2009 | Mirchandani et al. |
| 7,101,446 | B2 | 9/2006 | Takeda et al. | 2009/0301788 A1 | 12/2009 | Stevens et al. |
| 7,112,143 | B2 | 9/2006 | Muller | 2010/0044114 A1 | 2/2010 | Mirchandani et al. |
| 7,125,207 | B2 | 10/2006 | Craig et al. | 2010/0044115 A1 | 2/2010 | Mirchandani et al. |
| 7,128,773 | B2 | 10/2006 | Liang et al. | 2010/0278603 A1 | 11/2010 | Fang et al. |
| 7,147,413 | B2 | 12/2006 | Henderer et al. | 2010/0290849 A1 | 11/2010 | Mirchandani et al. |
| 7,175,404 | B2 | 2/2007 | Kondo et al. | 2010/0303566 A1 | 12/2010 | Fang et al. |
| 7,207,750 | B2 | 4/2007 | Annanolli et al. | 2011/0011965 A1 | 1/2011 | Mirchandani et al. |
| 7,238,414 | B2 | 7/2007 | Benitsch et al. | 2011/0107811 A1 | 5/2011 | Mirchandani et al. |
| 7,244,519 | B2 | 7/2007 | Festeau et al. | 2011/0265623 A1 | 11/2011 | Mirchandani et al. |
| 7,250,069 | B2 | 7/2007 | Kembaiyan et al. | 2011/0284179 A1 | 11/2011 | Stevens et al. |
| 7,261,782 | B2 | 8/2007 | Hwang et al. | 2011/0287238 A1 | 11/2011 | Stevens et al. |
| 7,267,543 | B2 | 9/2007 | Freidhoff et al. | 2011/0287924 A1 | 11/2011 | Stevens |
| 7,270,679 | B2 | 9/2007 | Istephanous et al. | 2011/0290566 A1 | 12/2011 | Mirchandani et al. |
| 7,381,283 | B2 | 6/2008 | Lee et al. | | | |
| 7,384,413 | B2 | 6/2008 | Gross et al. | FOREIGN PATENT DOCUMENTS | | |
| 7,384,443 | B2 | 6/2008 | Mirchandani et al. | DE 102006030661 A1 | | 1/2008 |
| 7,410,610 | B2 | 8/2008 | Woodfield et al. | EP 0641620 B1 | | 2/1908 |
| 7,497,396 | B2 | 3/2009 | Splinter et al. | EP 0157625 A2 | | 10/1985 |
| 7,513,320 | B2 | 4/2009 | Mirchandani et al. | EP 1065021 A1 | | 1/2001 |
| 7,524,351 | B2 | 4/2009 | Hua et al. | EP 1066901 A2 | | 1/2001 |
| 7,556,668 | B2 | 7/2009 | Eason et al. | EP 1077783 B1 | | 2/2001 |
| 7,575,620 | B2 | 8/2009 | Terry et al. | EP 1106706 A1 | | 6/2001 |
| 7,625,157 | B2 | 12/2009 | Prichard et al. | EP 0759480 B1 | | 1/2002 |
| 7,661,491 | B2 | 2/2010 | Kembaiyan et al. | EP 1244531 B1 | | 10/2004 |
| 7,687,156 | B2 | 3/2010 | Fang | EP 1686193 A2 | | 8/2006 |
| 7,832,456 | B2 | 11/2010 | Calnan et al. | FR 2627541 A2 | | 8/1989 |
| 7,832,457 | B2 | 11/2010 | Calnan et al. | GB 622041 | | 4/1949 |
| 7,846,551 | B2 | 12/2010 | Fang et al. | GB 945227 | | 12/1963 |
| 7,887,747 | B2 | 2/2011 | Iwasaki et al. | GB 1082568 | | 9/1967 |
| 7,954,569 | B2 | 6/2011 | Mirchandani et al. | GB 1309634 | | 3/1973 |
| 8,025,112 | B2 | 9/2011 | Mirchandani et al. | GB 1420906 | | 1/1976 |
| 8,087,324 | B2 | 1/2012 | Mirchandani et al. | GB 1491044 | | 11/1977 |
| 8,109,177 | B2 | 2/2012 | Kembaiyan et al. | GB 2158744 A | | 11/1985 |
| 8,141,665 | B2 | 3/2012 | Ganz | GB 2218931 A | | 11/1989 |
| 2002/0004105 | A1 | 1/2002 | Kunze et al. | GB 2315452 A | | 2/1998 |
| 2003/0010409 | A1 | 1/2003 | Kunze et al. | GB 2324752 A | | 11/1998 |
| 2003/0041922 | A1 | 3/2003 | Hirose et al. | GB 2352727 A | | 2/2001 |
| 2003/0219605 | A1 | 11/2003 | Molian et al. | GB 2384745 A | | 8/2003 |
| 2004/0013558 | A1 | 1/2004 | Kondoh et al. | GB 2385350 A | | 8/2003 |
| 2004/0105730 | A1 | 6/2004 | Nakajima | GB 2393449 A | | 3/2004 |
| 2004/0228695 | A1 | 11/2004 | Clauson | GB 2397832 A | | 8/2004 |
| 2004/0234820 | A1 | 11/2004 | Majagi | GB 2435476 A | | 8/2007 |
| 2004/0244540 | A1 | 12/2004 | Oldham et al. | JP 51-124876 A | | 10/1976 |
| 2004/0245022 | A1 | 12/2004 | Izaguirre et al. | JP 59-54510 A | | 3/1984 |
| 2004/0245024 | A1 | 12/2004 | Kembaiyan | JP 59-56501 A | | 4/1984 |
| 2005/0008524 | A1 | 1/2005 | Testani | JP 59-67333 A | | 4/1984 |
| 2005/0084407 | A1 | 4/2005 | Myrick | JP 59-169707 A | | 9/1984 |
| 2005/0103404 | A1 | 5/2005 | Hsieh et al. | JP 59-175912 A | | 10/1984 |
| 2005/0117984 | A1 | 6/2005 | Eason et al. | JP 60-48207 A | | 3/1985 |
| 2005/0194073 | A1 | 9/2005 | Hamano et al. | JP 60-172403 A | | 9/1985 |
| 2005/0211475 | A1 | 9/2005 | Mirchandani et al. | JP 61-226231 A | | 10/1986 |
| 2005/0247491 | A1 | 11/2005 | Mirchandani et al. | JP 61-243103 A | | 10/1986 |
| 2005/0268746 | A1 | 12/2005 | Abkowitz et al. | JP 61057123 B | | 12/1986 |

| | | |
|---|---|---|
| JP | 62-34710 A | 2/1987 |
| JP | 62-063005 A | 3/1987 |
| JP | 62-218010 A | 9/1987 |
| JP | 62-278250 A | 12/1987 |
| JP | 1-171725 A | 7/1989 |
| JP | 2-95506 A | 4/1990 |
| JP | 2-269515 A | 11/1990 |
| JP | 3-43112 A | 2/1991 |
| JP | 3-73210 A | 3/1991 |
| JP | 5-50314 A | 3/1993 |
| JP | 5-92329 A | 4/1993 |
| JP | H05-64288 U | 8/1993 |
| JP | H03-119090 U | 6/1995 |
| JP | 8-120308 A | 5/1996 |
| JP | H8-209284 | 8/1996 |
| JP | 8-294805 A | 11/1996 |
| JP | 9-192930 A | 7/1997 |
| JP | 9-253779 A | 9/1997 |
| JP | 10-138033 A | 5/1998 |
| JP | 10219385 A | 6/1998 |
| JP | H10-511740 A | 11/1998 |
| JP | 11-300516 A | 11/1999 |
| JP | 2000-237910 A | 9/2000 |
| JP | 2000-296403 A | 10/2000 |
| JP | 2000-355725 A | 12/2000 |
| JP | 2002-097885 A | 4/2002 |
| JP | 2002-166326 A | 6/2002 |
| JP | 02254144 A | 9/2002 |
| JP | 2002-317596 A | 10/2002 |
| JP | 2003-306739 A | 10/2003 |
| JP | 2004-514065 A | 5/2004 |
| JP | 2004-160591 A | 6/2004 |
| JP | 2004-181604 | 7/2004 |
| JP | 2004-190034 A | 7/2004 |
| JP | 2005-111581 A | 4/2005 |
| KR | 20050055268 | 6/2005 |
| RU | 2135328 C1 | 8/1999 |
| RU | 2167262 C2 | 5/2001 |
| SU | 967786 A1 | 10/1982 |
| SU | 975369 A1 | 11/1982 |
| SU | 990423 A1 | 1/1983 |
| SU | 1269922 A | 11/1986 |
| SU | 1292917 A1 | 2/1987 |
| SU | 1350322 | 11/1987 |
| UA | 6742 | 12/1994 |
| UA | 63469 C2 | 1/2006 |
| UA | 23749 U | 6/2007 |
| WO | WO 92/05009 A1 | 4/1992 |
| WO | WO 92/22390 A1 | 12/1992 |
| WO | WO 97/34726 A1 | 9/1997 |
| WO | WO 98/28455 A1 | 7/1998 |
| WO | WO 99/13121 A1 | 3/1999 |
| WO | WO 00/43628 A2 | 7/2000 |
| WO | WO 00/52217 A1 | 9/2000 |
| WO | WO 01/43899 A1 | 6/2001 |
| WO | WO 03/010350 A1 | 2/2003 |
| WO | WO 03/011508 A2 | 2/2003 |
| WO | WO 03/049689 A2 | 6/2003 |
| WO | WO 2004/053197 A2 | 6/2004 |
| WO | WO 2005/045082 A1 | 5/2005 |
| WO | WO 2005/054530 A1 | 6/2005 |
| WO | WO 2005/061746 A1 | 7/2005 |
| WO | WO 2005/106183 A1 | 11/2005 |
| WO | WO 2006/071192 A1 | 7/2006 |
| WO | WO 2006/104004 A1 | 10/2006 |
| WO | WO 2007/001870 A2 | 1/2007 |
| WO | WO 2007/022336 A2 | 2/2007 |
| WO | WO 2007/030707 A1 | 3/2007 |
| WO | WO 2007/044791 A1 | 4/2007 |
| WO | WO 2007/127680 A1 | 11/2007 |
| WO | WO 2008/098636 A1 | 8/2008 |
| WO | WO 2008/115703 A1 | 9/2008 |
| WO | WO 2011/008439 A2 | 1/2011 |

OTHER PUBLICATIONS

Coyle, T.W. and A, Bahrami, "Structure and Adhesion of Ni and Ni-WC Plasma Spray Coatings," Thermal Spray, Surface Engineering via Applied Research, Proceedings of the 1st International Thermal Spray Conference, May 8-11, 2000, Montreal, Quebec, Canada, 2000, pp. 251-254.

Deng, X. et al., "Mechanical Properties of a Hybrid Cemented Carbide Composite," International Journal of Refractory Metals and Hard Materials, Elsevier Science Ltd., vol. 19, 2001, pp. 547-552.

Gurland, Joseph, "Application of Quantitative Microscopy to Cemented Carbides," Practical Applications of Quantitative Matellography, ASTM Special Technical Publication 839, ASTM 1984, pp. 65-84.

Hayden, Matthew and Lyndon Scott Stephens, "Experimental Results for a Heat-Sink Mechanical Seal," Tribology Transactions, 48, 2005, pp. 352-361.

Metals Handbook, vol. 16 Machining, "Cemented Carbides" (ASM International 1989), pp. 71-89.

Metals Haudbook, vol. 16 Machining, "Tapping" (ASM International 1989), pp. 255-267.

Peterman, Walter, "Heat-Sink Compound Protects the Unprotected," Welding Design and Fabrication, Sep. 2003, pp. 20-22.

Shi et al., "Composite Ductility—The Role of Reinforcement and Matrix", TMS Meeting, Las Vegas, NV, Feb. 12-16, 1995, 10 pages.

Sriram, et al., "Effect of Cerium Addition on Microstructures of Carbon-Alloyed Iron Aluminides," Bull. Mater. Sci., vol. 28, No. 6, Oct. 2005, pp. 547-554.

Tracey et al., "Development of Tungsten Carbide-Cobalt-Ruthenium Cutting Tools for Machining Steels" Proceedings Annual Microprogramming Workshop, vol. 14, 1981, pp. 281-292.

Underwood. Quantitative Stereology, pp. 23-108 (1970).

Vander Vort, "Introduction to Quantitative Metallography", Tech Notes, vol. 1, Issue 5, published by Buehler, Ltd. 1997, 6 pages.

J. Gurland, Quantitative Microscopy, R.T. DeHoff and F.N. Rhines, eds., McGraw-Hill Book Company, New York, 1968, pp. 279-290.

You Tube, "The Story Behind Kennametal's Beyond Blast", dated Sep. 14, 2010, http://www.youtube.com/watch?v=8_A-bYVwmU8 (3 pages) accessed on Oct. 14, 2010.

Kennametal press release on Jun. 10. 2010, http://news.thomasnet.com/companystory/Kennametal-Launches-Beyong-BLAST-TM-at-IMTS-2010-Booth-W-1522-833445 (2 pages) accessed on Oct. 14, 2010.

Pages from Kennametal site, https://www.kennmetal.com/en-US/promotions/Beyond_Blast.jhtml (7 pages) accessed on Oct. 14, 2010.

ASM Materials Engineering Dictionary. J.R. Davis, Ed., ASM International, Fifth printing, Jan. 2006, p. 98.

Childs et al., "Metal Machining", 2000, Elsevier, p. 111.

Brookes, Kenneth J. A., "World Directory and Handbook of Hardmetals and Hard Materials", International Carbide Data, U.K, 1996, Sixth Edition, p. 42.

Fifth Sterling grade chart, Allegheny Technologies, attached to Declaration of Prakash Mirchandani, Ph.D. as filed in U.S. Appl. No. 11/737,993, filed Sep. 9, 2009.

Metals Handbook Desk Edition, definition of 'wear', 2nd Ed., J.R. Davis, Editor, ASM International 1998, p. 62.

McGraw-Hill Dictionary of Scientific and Technical Terms, 5th Edition, Sybil P. Parker, Editor in Chief, 1993, pp. 799, 800, 1933, and 2047.

Office Action mailed Jun. 1, 2001 in U.S. Appl. No. 09/460,540.
Office Action mailed Dec. 1, 2001 in U.S. Appl. No. 09/460,540.
Office Action mailed Mar. 15, 2002 in U.S. Appl. No. 09/460,540.
Office Action mailed Jun. 18, 2002 in U.S. Appl. No. 09/460,540.
Notice of Allowance mailed Oct. 21, 2002 in U.S. Appl. No. 09/460,540.
Office Action mailed Jan. 16, 2007 in U.S. Appl. No. 11/013,842.
Office Action mailed Jul. 16, 2006 in U.S. Appl. No. 11/013,842.
Office Action mailed Jul. 30, 2007 in U.S. Appl. No. 11/013,842.
Notice of Allowance mailed Nov. 26, 2008 in U.S. Appl. No. 11/013,842.
Office Action mailed Oct. 21, 2006 in U.S. Appl. No. 11/167,811.
Office Action mailed Oct. 13, 2006 in U.S. Appl. No. 10/922,750.
Notice of Allowance mailed May 21, 2007 for U.S. Appl. No. 10/922,750.
Supplemental Notice of Allowability mailed Jul. 3, 2007 for U.S. Appl. No. 10/922,750.

Office Action mailed May 3, 2010 in U.S. Appl. No. 11/924,273.
Office Action mailed Oct. 14, 2010 in U.S. Appl. No. 11/924,273.
Office Action mailed Feb. 2, 2011 in U.S. Appl. No. 11/924,273.
Office Action mailed Dec. 29, 2005 in U.S. Appl. No. 10/903,196.
Office Action mailed Sep. 26, 2007 U.S. Appl. No. 10/903,198.
Office Action mailed Apr. 22, 2010 in U.S. Appl. No. 12/196,951.
Office Action mailed Oct. 29, 2010 in U.S. Appl. No. 12/196,951.
Office Action mailed Apr. 12, 2011 in U.S. Appl. No. 12/196,951.
Office Action mailed May 29, 2007 in U.S. Appl. No. 11/116,752.
Office Action mailed Aug. 12, 2008 in U.S. Appl. No. 11/116,752.
Office Action mailed Jul. 9, 2009 in U.S. Appl. No. 11/116,752.
Office Action mailed Jan. 15, 2008 in U.S. Appl. No. 11/116,752.
Notice of Allowance mailed Jan. 27, 2009 in U.S. Appl. No. 11/116,752.
Restriction Requirement mailed Sep. 8, 2006 in U.S. Appl. No. 10/848,437.
Office Action mailed May 7, 2007 in U.S. Appl. No. 10/848,437.
Office Action mailed Jan. 24, 2008 in U.S. Appl. No. 10/848,437.
Pre-Appeal Brief Conference Decision mailed May 14, 2008 in U.S. Appl. No. 10/848,437.
Office Action mailed Mar. 19, 2009 in U.S. Appl. No. 11/737,993.
Office Action mailed Jun. 3, 2009 in U.S. Appl. No. 11/737,993.
Office Action mailed Dec. 9, 2009 in U.S. Appl. No. 11/737,993.
Office Action mailed Feb. 24, 2010 in U.S. Appl. No. 11/737,993.
Office Action mailed Jun. 29, 2010 in U.S. Appl. No. 11/737,993.
Advisory Action Before the Filing of an Appeal Brief mailed Sep. 9, 2010 in U.S. Appl. No. 11/737,993.
Pre-Brief Appeal Conference Decision mailed Nov. 22, 2010 in U.S. Appl. No. 11/737,993.
Office Action mailed Apr. 20, 2011 in U.S. Appl. No. 11/737,993.
Office Action mailed Aug. 3, 2011 in U.S. Appl. No. 11/737,993.
Office Action mailed Oct. 11, 2011 in U.S. Appl. No. 11/737,993.
Office Action mailed Jan. 6, 2012 in U.S. Appl. No. 11/737,993.
Advisory Action Before the Filing of an Appeal Brief mailed Mar. 22, 2012 in U.S. Appl. No. 11/737,993.
Restriction Requirement mailed Sep. 17, 2010 in U.S. Appl. No. 12/397,597.
Office Action mailed Nov. 15, 2010 in U.S. Appl. No. 12/397,597.
Office Action mailed Jun. 7, 2011 in U.S. Appl. No. 12/397,597.
Advisory Action Before the Filing of an Appeal Brief mailed Aug. 31, 2011 in U.S. Appl. No. 12/397,597.
Office Action mailed Nov. 17, 2011 in U.S. Appl. No. 12/397,597.
Advisory Action mailed Jan. 26, 2012 in U.S. Appl. No. 12/397,597.
Office Action mailed Apr. 13, 2012 in U.S. Appl. No. 12/397,597.
Office Action mailed Dec. 29, 2005 in U.S. Appl. No. 10/903,198.
Office Action mailed Sep. 29, 2006 in U.S. Appl. No. 10/903,198.
Office Action mailed Mar. 27, 2007 in U.S. Appl. No. 10/903,198.
Office Action mailed Sep. 26, 2007 in U.S. Appl. No. 10/903,198.
Office Action mailed Jan. 16, 2008 in U.S. Appl. No. 10/903,198.
Office Action mailed Oct. 31, 2008 in U.S. Appl. No. 10/903,198.
Office Action mailed Apr. 17, 2009 in U.S. Appl. No. 10/903,198.
Advisory Action before mailing of Appeal Brief mailed Jun. 29, 2009 in U.S. Appl. No. 10/903,198.
Examiner's Answer mailed Aug. 17, 2010 in U.S. Appl. No. 10/903,198.
Office Action mailed Oct. 19, 2011 in U.S. Appl. No. 12/196,951.
Office Action mailed Mar. 19, 2012 in U.S. Appl. No. 12/196,951.
Office Action mailed Oct. 13, 2011 in U.S. Appl. No. 12/179,999.
Notice of Allowance mailed Apr. 30, 2012 in U.S. Appl. No. 12/179,999.
Office Action mailed Aug. 29, 2011 in U.S. Appl. No. 12/476,738.
Office Action mailed Dec. 21, 2011 in U.S. Appl. No. 12/476,738.
Notice of Allowance mailed Apr. 17, 2012 in U.S. Appl. No. 12/476,738.
Office Action mailed Nov. 14, 2011 in U..S. Appl. No. 12/502,277.
Office Action mailed Jan. 20, 2012 in U.S. Appl. No. 12/502,277.
Office Action mailed Mar. 15, 2012 in U.S. Appl. No. 12/464,607.
Notice of Allowance mailed Apr. 9, 2012 in U.S. Appl. No. 12/464,607.
Office Action mailed Oct. 31, 2011 in U.S. Appl. No. 13/207,478.
Office Action mailed Mar. 2, 2012 in U.S. Appl. No. 13/207,478.
Notice of Allowance mailed Apr. 13, 2012 in U.S. Appl. No. 13/207,478.
Office Action mailed Dec. 5, 2011 in U.S. Appl. No. 13/182,474.
Office Action mailed Apr. 27, 2012 in U.S. Appl. No. 13/182,474.
U.S. Appl. No. 12/616,300, filed Nov. 11, 2009.
Office Action mailed May 14, 2009 in U.S. Appl. No. 11/687,343.
Office Action mailed Jan. 21, 2010 in U.S. Appl. No. 11/687,343.
Notice of Allowance mailed May 18, 2010 in U.S. Appl. No. 11/687,343.
Restriction Requirement mailed Aug. 4, 2010 in U.S. Appl. No. 12/196,815.
Office Action mailed Oct. 27, 2010 in U.S. Appl. No. 12/196,815.
Office Action mailed Nov. 17, 2010 in U.S. Appl. No. 12/196,815.
Notice of Allowance mailed Jan. 27, 2011 in U.S. Appl. No. 12/196,815.
Notice of Allowance mailed May 16, 2011 in U.S. Appl. No. 12/196,815.
Office Action mailed Aug. 31, 2007 in U.S. Appl. No. 11/206,368.
Office Action mailed Feb. 28, 2008 in U.S. Appl. No. 11/206,368.
Pre-Appeal Conference Decision mailed Jun. 19, 2008 in U.S. Appl. No. 11/206,368.
Notice of Allowance mailed Nov. 13, 2008 in U.S. Appl. No. 11/206,368.
Office Action mailed Apr. 30, 2009 in U.S. Appl. No. 11/206,368.
Notice of Allowance mailed Nov. 30, 2009 in U.S. Appl. No. 11/206,368.
Office Action mailed Sep. 2, 2011 in U.S. Appl. No. 12/850,003.
Notice of Allowance mailed Nov. 15, 2011 in U.S. Appl. No. 12/850,003.
Interview Summary mailed Feb. 16, 2011 in U.S. Appl. No. 11/924,273.
Interview Summary mailed May 9, 2011 in U.S. Appl. No. 11/924,273.
Notice of Allowance mailed Jun. 24, 2011 in U.S. Appl. No. 11/924,273.
ProKon Version 8.6, The Calculation Companion, Properties for W, Ti, Mo, Co, Ni and FE, Copyright 1997-1998, 6 pages.
Tibtech Innovations, "Properties table of stainless steel, metals and other conductive materials", printed from http://www.tibtech.com/conductivity.php on Aug. 19, 2011, 1 page.
"Material: Tungsten Carbide (WC), bulk", MEMSnet, printed from http://www.memsnet.org/material/tungstencarbidewcbulk/ on Aug. 19, 2001, 1 page.
Williams, Wendell S., "The Thermal Conductivity of Metallic Ceramics", JOM, Jun. 1998, pp. 62-66.
Brookes, Kenneth J. A., "World Directory and Handbook of Hardmetals and Hard Materials", International Carbide Data, U.K. 1996, Sixth Edition, pp. D182-D184.
Thermal Conductivity of Metals, The Engineering ToolBox, printed from http://www.engineeringtoolbox.com/thermal-conductivity-metals-d_858.html on Oct. 27, 2011, 3 pages.
The Thermal Conductivity of Some Common Materials and Gases, The Engineering ToolBox, printed from http://www.engineeringtoolbox.com/thermal-conductivity-d_429.html on Dec. 15, 2011, 4 pages.
ASTM G65-04, Standard Test Method for Measuring Abrasion Using the Dry Sand, Nov. 1, 2004, printed from http://infostore.saiglobal.com.
Tool and Manufacturing Engineers Handbook, Fourth Edition, vol. 1, Machining, Society of Manufacturing Engineers, Chapter 12, vol. 1, 1983, pp. 12-110-12-114.
Beard, T. "The INS and OUTS of Thread Milling; Emphasis: Hole Making, Interview", Modern Machine Shop, Gardner Publications, Inc. 1991, vol. 64, No. 1, 5 pages.
Koelsch, J., "Thread Milling Takes on Tapping", Manufacturing Engineering, 1995, vol. 115, No. 4, 6 pages.
Johnson, M. "Tapping", Traditional Machining Processes, 1997, pp. 255-265.
"Thread Milling", Traditional Machining Processes, 1997, pp. 268-269.
Scientific Cutting Tools, "The Cutting Edge", 1998, printed on Feb. 1, 2000, 15 pages.
Helical Carbide Thread Mills, Schmarje Tool Company, 1998, 2 pages.
Pyrotek, Zyp Zircwash, www.pyrotek.info, Feb. 2003, 1 page.

Sims et al., "Casting Engineering", Superalloys II, Aug. 1987, pp. 420-426.
Sikkenga, "Cobalt and Cobalt Alloy Castings", Casting, vol. 15, ASM Handbook, ASM International, 2008, pp. 1114-1118.
Starck, H.C., Surface Technology, Powders for PTA-Welding, Lasercladding and other Wear Protective Welding Applications, Jan. 2011, 4 pages.
Restriction Requirement mailed Jul. 24, 2008 in U.S. Appl. No. 11/167,811.
Office Action mailed Oct. 21, 2008 in U.S. Appl. No. 11/167,811.
Final Office Action mailed Jun. 12, 2009 in U.S. Appl. No. 11/167,811.
Office Action mailed Aug. 28, 2009 in U.S. Appl. No. 11/167,811.
Office Action mailed Mar. 2, 2010 in U.S. Appl. No. 11/167,811.
Office Action mailed Aug. 19, 2010 in U.S. Appl. No. 11/167,811.
Advisory Action Before the Filing of an Appeal Brief mailed May 12, 2010 in U.S. Appl. No. 11/167,811.
Office Action mailed Feb. 3, 2011 in U.S. Appl. No. 11/167,811.
Advisory Action mailed May 11, 2011 in U.S. Appl. No. 11/167,811.
Office Action mailed Jul. 22, 2011 in U.S. Appl. No. 11/167,811.
Office Action mailed Mar. 28, 2012 in U.S. Appl. No. 11/167,811.
US 4,966,627, 10/1990, Keshavan et al. (withdrawn)

* cited by examiner

Transverse Section

Longitudinal Section

Straight Single Hole

Straight Two Hole

Two Hole Spiral or Helical

Three Hole Spiral or Helical

Coextruded Composite Carbide Rod With Integral Coolant
Channels Exiting From Die With Spiral Serrations Powder Compaction of Outer Grade Onto an Extruded
Rod With Integral Coolant Holes Longitudinal Cross-Section of Composite Rod With Integral Coolant Channels
(Nylon Wires Inserted Into Channels to Show Their Location)

Longitudinal Cross-Section of Drill Made From Composite
Cemented Carbide and Having Integral Coolant Channels

INJECTION MOLDING FABRICATION METHOD

CROSS REFERENCE TO RELATED APPLICATION

This application is a continuation-in-part application claiming priority under 35 U.S.C. § 120 from co-pending U.S. patent application Ser. No. 11/167,811 filed on Jun. 27, 2005.

TECHNICAL FIELD AND INDUSTRIAL APPLICABILITY OF THE INVENTION

The present invention is generally directed to methods of forming articles, such as tool blanks and other injection molded articles, having a composite construction including regions of differing composition and/or microstucture. The present invention is additionally directed to rotary tools and tool blanks for rotary tools having a composite construction and at least one coolant channel. The method of the present invention finds general application in the production of articles and may be applied in, for example, the production of cemented carbide rotary tools used in material removal operations such as drilling, reaming, countersinking, counterboring, and end milling.

DESCRIPTION OF THE INVENTION BACKGROUND

Cemented carbide rotary tools (i.e., tools driven to rotate) are commonly employed in machining operations such as, for example, drilling, reaming, countersinking, counterboring, end milling, and tapping. Such tools are typically of a solid monolithic construction. The manufacturing process for such tools may involve consolidating metallurgical powder (comprised of particulate ceramic and binder metal) to form a compact. The compact is then sintered to form a cylindrical tool blank having a solid monolithic construction. As used herein, monolithic construction means that the tools are composed of a material, such as, for example, a cemented carbide material, having substantially the same characteristics at any working volume within the tool. Subsequent to sintering, the tool blank is appropriately machined to form the cutting edge and other features of the particular geometry of the rotary tool. Rotary tools include, for example, drills, end mills, reamers, and taps.

Rotary tools composed of cemented carbides are adapted to many industrial applications, including the cutting and shaping of materials of construction such as metals, wood, and plastics. Cemented carbide tools are industrially important because of the combination of tensile strength, wear resistance, and toughness that is characteristic of these materials. Cemented carbides materials comprise at least two phases: at least one hard ceramic component and a softer matrix of metallic binder. The hard ceramic component may be, for example, carbides of elements within groups IVB through VIB of the periodic table. A common example is tungsten carbide. The binder may be a metal or metal alloy, typically cobalt, nickel, iron or alloys of these metals. The binder "cements" the ceramic component within a matrix interconnected in three dimensions. Cemented carbides may be fabricated by consolidating a metallurgical powder blend of at least one powdered ceramic component and at least one powdered binder.

The physical and chemical properties of cemented carbide materials depend in part on the individual components of the metallurgical powders used to produce the material. The properties of the cemented carbide materials are determined by, for example, the chemical composition of the ceramic component, the particle size of the ceramic component, the chemical composition of the binder, and the ratio of binder to ceramic component. By varying the components of the metallurgical powder, rotary tools such as drills and end mills can be produced with unique properties matched to specific applications.

Monolithic rotary tools may additionally comprise coolant channels extending through its body and shank to permit the flow of a coolant, such as oil or water, to the cutting surfaces of the rotary tool. The coolant may enter the channel at the shank end and exit at the drill point. The coolant cools the rotary tool and work piece and assists in ejecting chips and dirt from the hole. The use of coolant during machining operations allows for the use of higher cutting speeds of the rotary tool and faster feed rates, in addition to extending tool life. Rotary tools with coolant channels are especially suited for drilling deep holes in hard materials.

However, the monolithic construction of rotary tools inherently limits their performance and range of applications. As an example, FIG. 1 depicts side and end views of a twist drill 10 having a typical design used for creating and finishing holes in construction materials such as wood, metals, and plastics. The twist drill 10 includes a chisel edge 11, which makes the initial cut into the workpiece. The cutting tip 14 of the drill 10 follows the chisel edge 11 and removes most of the material as the hole is being drilled. The outer periphery 16 of the cutting tip 14 finishes the hole. During the cutting process, cutting speeds vary significantly from the center of the drill to the drill's outer periphery. This phenomenon is shown in FIG. 2, which graphically compares cutting speeds at an inner (D1), outer (D3), and intermediate (D2) diameter on the cutting tip of a typical twist drill. In FIG. 2(b), the outer diameter (D3) is 1.00 inch and diameters D1 and D2 are 0.25 and 0.50 inch, respectively. FIG. 2(a) shows the cutting speeds at the three different diameters when the twist drill operates at 200 revolutions per minute. As illustrated in FIGS. 2(a) and (b), the cutting speeds measured at various points on the cutting edges of rotary tools will increase with the distance from the axis of rotation of the tools.

Because of these variations in cutting speed, drills and other rotary tools having a monolithic construction will not experience uniform wear and/or chipping and cracking of the tool's cutting edges at different points ranging from the center to the outside edge of the tool's cutting surface. Also, in drilling casehardened materials, the chisel edge is typically used to penetrate the case, while the remainder of the drill body removes material from the casehardened material's softer core. Therefore, the chisel edge of conventional drills of monolithic construction used in that application will wear at a much faster rate than the remainder of the cutting edge, resulting in a relatively short service life for such drills. In both instances, because of the monolithic construction of conventional cemented carbide drills, frequent regrinding of the cutting edge is necessary, thus placing a significant limitation on the service life of the bit. Frequent regrinding and tool changes also result in excessive downtime for the machine tool that is being used.

Therefore, composite articles, such as composite rotary tools have been used, such as those tools described in described in U.S. Pat. No. 6,511,265 which is hereby incorporated by reference in its entirety. If designed properly, composite rotary tools may have increased tool service life as compared to rotary tools having a more monolithic construction. However, there exists a need for drills and other rotary tools that have different characteristics at different regions of the tool and comprise coolant channels. As an example, a need exists for cemented carbide drills and other rotary tools that will experience substantially even wear regardless of the position on the tool face relative to the axis of rotation of the tool and allow cooling at the cutting surfaces. There is a need for a composite rotary tool having coolant channels so composite rotary tools may have the same benefits as monolithic rotary tools. There is also a need for a versatile method of producing composite rotary tools and composite rotary tools comprising coolant channels.

SUMMARY

The invention is directed to a method of forming an article, wherein the method comprises injecting at least two composite materials comprising metal carbides into a mold to form a green compact. Embodiments of the method are an injection molding process for forming cemented carbide articles. The two composite materials may be metal powders comprising a binder metal, a hard particle. The composite material may further comprise a plastic binder. The two different composite materials may be injected into the mold to form the green compact. Additionally, the composite materials may be injected through a die before entering the mold. In a specific embodiment, the die forms at least one internal channel within the green compact. The green compact formed in embodiments of the method comprises at least two cemented carbide grades. In certain embodiments, the cemented carbide grades are coaxially disposed and comprise two helical channels.

The reader will appreciate the foregoing details and advantages of the present invention, as well as others, upon consideration of the following detailed description of embodiments of the invention. The reader also may comprehend such additional details and advantages of the present invention upon using the invention.

BRIEF DESCRIPTION OF THE DRAWINGS

The features and advantages of the present invention may be better understood by reference to the accompanying drawings in which.

DESCRIPTION OF EMBODIMENTS OF THE INVENTION

The present invention provides rotary cutting tools, cutting tool blanks, rods, and other articles having a composite construction and a method of making such articles. The articles may further comprise internal channels, such as coolant channels, if desired. As used herein, a rotary tool is a tool having at least one cutting edge that is driven to rotate. As used herein, "composite" construction refers to an article having regions differing in chemical composition and/or microstructure. These differences result in the regions having properties differing with respect to at least one characteristic. The characteristic may be at least one of, for example, hardness, tensile strength, wear resistance, fracture toughness, modulus of elasticity, corrosion resistance, coefficient of thermal expansion, and coefficient of thermal conductivity. Composite rotary tools that may be constructed as provided in the present invention include drills and end mills, as well as other tools that may be used in, for example, drilling, reaming, countersinking, counterboring, end milling, and tapping of materials.

The present invention more specifically provides a composite rotary tool having at least one cutting edge, at least two regions of cemented carbide material that differ with respect to at least one characteristic, and at least one coolant channel. The differing characteristics may be provided by variation of at least one of the chemical composition and the microstructure among the two regions of cemented carbide material. The chemical composition of a region is a function of, for example, the chemical composition of the ceramic component and/or binder of the region and the carbide-to-binder ratio of the region. For example, one of the two cemented carbide material regions of the rotary tool may exhibit greater wear resistance, enhanced hardness, and/or a greater modulus of elasticity than the other of the two regions.

Figure 1A:
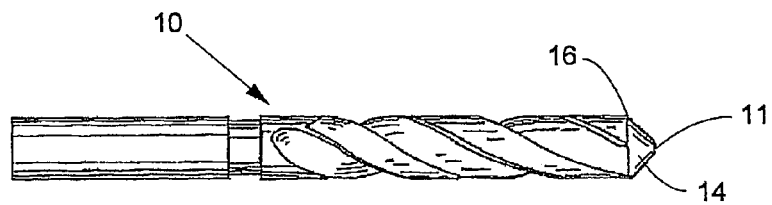
FIGS. 1(a) and 1(b) are plan and on-end views, respectively, of a conventional twist drill with coolant channels.
Figure 1B:
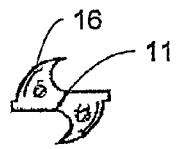
Figure 2A:
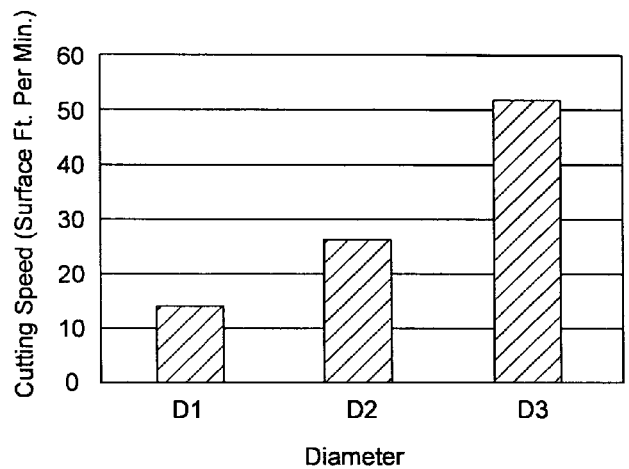
FIG. 2(a) is a graph indicating cutting speeds at the three diameters D1, D2, and D3 of a conventional twist drill indicated in FIG. 2(b)
Figure 2B:
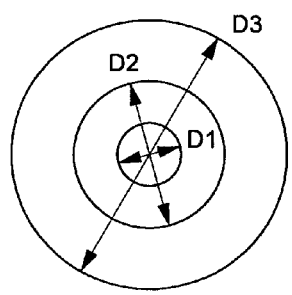
Figure 3A:
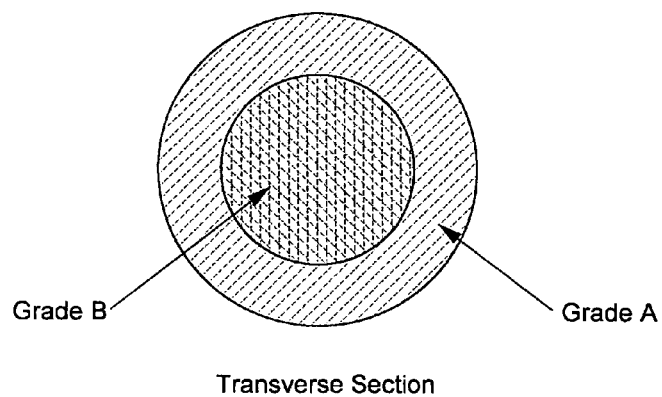
FIGS. 3(a) and (b) include a transverse section (FIG. 3(a) and a longitudinal section (FIG. 3(b)) of rods produced by embodiments of the method of the present invention comprising a core of centered carbide grade B and a shell of cemented carbide grade A.
Figure 3B:
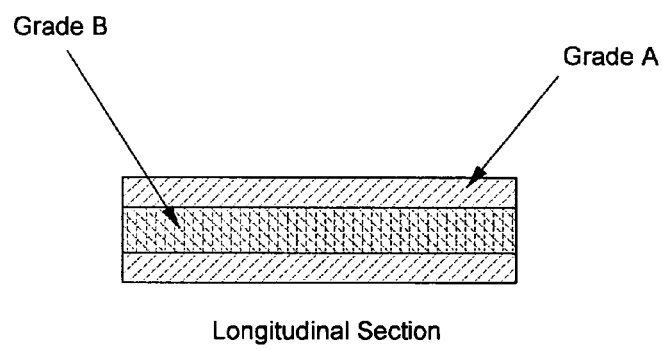
Figure 4A:
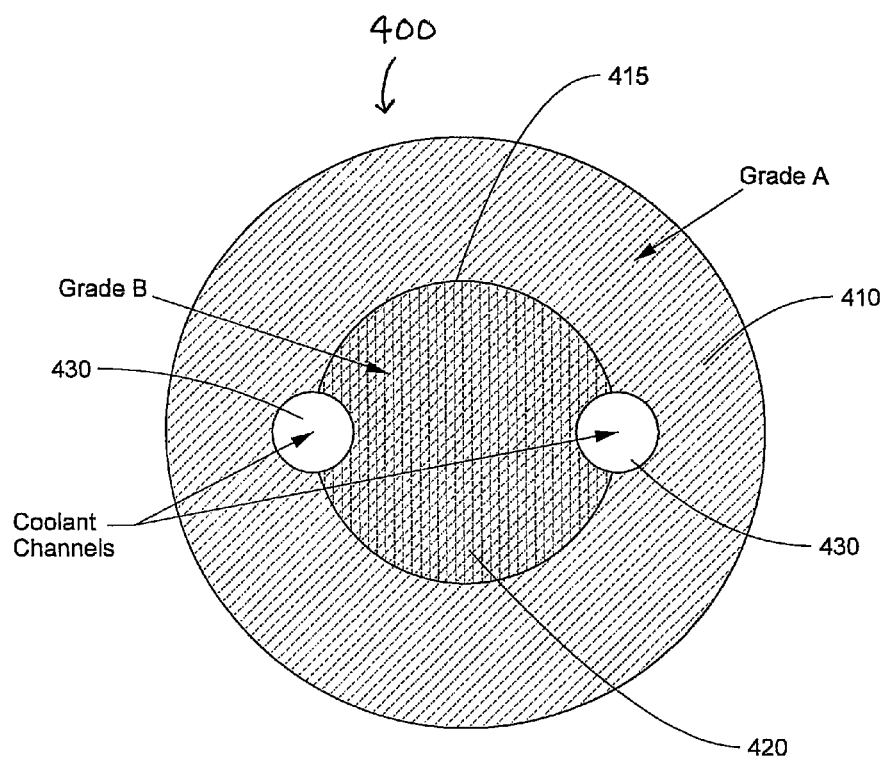
FIGS. 4(a)-(d) are representations of a cross-sectional views of an embodiments of a composite cemented carbide.

Aspects of present invention may be described in relation to the tool blank 400, shown in FIG. 4(a) in a cross-sectional view transverse to the axis. The tool blank 400 is a generally cylindrical sintered compact with two coaxially disposed cemented carbide regions 410, 420 and coolant channels 430. It will be apparent to one skilled in the art, however, that the following discussion of the present invention also may be adapted to the fabrication of composite rotary tools and tool blanks having more complex geometry and/or more than two regions. Thus, the following discussion is not intended to restrict the invention, but merely to illustrate embodiments of it.

In the embodiment of FIG. 4(a), the cylindrical rotary tool blank 400 is comprised of two differing cemented carbide regions, a core region 420 and an outer region 410. The core region 420 and the outer region 410 are both of a cemented carbide material including ceramic particles in a continuous matrix of binder. Preferably, the cemented carbide materials in the core region 420 and in the outer region 410 include a ceramic component composed of carbides of one or more elements belonging to groups IVB through VIB of the periodic table including less than 5% cubic carbides or, in some applications, less than 3 wt. % cubic carbides. Embodiments of the present invention may comprise less than 5 wt. % cubic carbides because cubic carbides may reduce strength transverse rupture strength of the article, increase the production costs, and reduce the fracture toughness. This is especially important for tools used to machine hard work pieces where the machining results in a shearing action and the strength of the drill should be the greatest.

The ceramic component preferably comprises about 60 to about 98 weight percent of the total weight of the cemented carbide material in each region. The carbide particles are embedded within a matrix of binder material that preferably constitutes about 2 to about 40 weight percent of the total material in each region. The binder preferably is one or more of Co, Ni, Fe, and alloys of these elements. The binder also may contain, for example, elements such as W, Cr, Ti, Ta, V, Mo, Nb, Zr, Hf, and C up to the solubility limits of these elements in the binder. Additionally, the binder may contain up to 5 weight percent of elements such as Cu, Mn, Ag, Al, and Ru. One skilled in the art will recognize that any or all of the constituents of the cemented carbide material may be introduced in elemental form, as compounds, and/or as master alloys.

The core region 420 of the tool blank 400 is autogenously bonded to the outer region 410 at an interface 415. The interface 415 is shown in FIG. 4(a) to be cylindrical, but it will be understood that the shapes of the interfaces of cemented carbide material regions of the composite rotary tools of the present invention are not limited to cylindrical configurations. The autogenous bond between the regions at the interface 415 may be formed by, for example, a matrix of binder that extends in three dimensions from the core region 420 to the outer region 410, or vice versa. The ratio of binder to ceramic component in the two regions may be the same or different and may be varied between the regions to affect the regions' relative characteristics. By way of example only, the ratio of binder to ceramic component in the adjacent regions of the composite tool blank 30 may differ by 1 to 10 weight percent. The characteristics of the cemented carbide materials in the different regions of the composite rotary tools of the present invention may be tailored to particular applications.

One skilled in the art, after having considered the description of present invention, will understand that the improved rotary tool of this invention could be constructed with several layers of different cemented carbide materials to produce a progression of the magnitude of one or more characteristics from a central region of the tool to its periphery. Thus, for example, a twist drill may be provided with multiple, coaxially disposed regions of cemented carbide material and wherein each such region has successively greater hardness and/or wear resistance than the adjacent, more centrally disposed region. Coolant channels may be provided in any of the regions or intersecting two or more regions. The method of the present invention provides great design flexibility in the design of extruded articles. Alternately, rotary tools of the present invention could be made with other composite configurations wherein differences in a particular characteristic occur at different regions of the tool.

A major advantage of the composite cemented carbide rotary tools of the present invention is the flexibility available to the tool designer to tailor properties of regions of the tools to suit different applications. For example, the size, location, thickness, geometry, and/or physical properties of the individual cemented carbide material regions of a particular composite blank of the present invention may be selected to suit the specific application of the rotary tool fabricated from the blank. In addition, the coolant channels may be located in the desired locations and be helical, spiral, linear, or a combination of such shapes. Thus, for example, the stiffness of one or more cemented carbide regions of the rotary tool experiencing significant bending during use may be of a cemented carbide material having an enhanced modulus of elasticity; the hardness and/or wear resistance of one or more cemented carbide regions having cutting surfaces and that experience cutting speeds greater than other regions may be increased; and/or the corrosion resistance of regions of cemented carbide material subject to chemical contact during use may be enhanced.

Figure 4B:
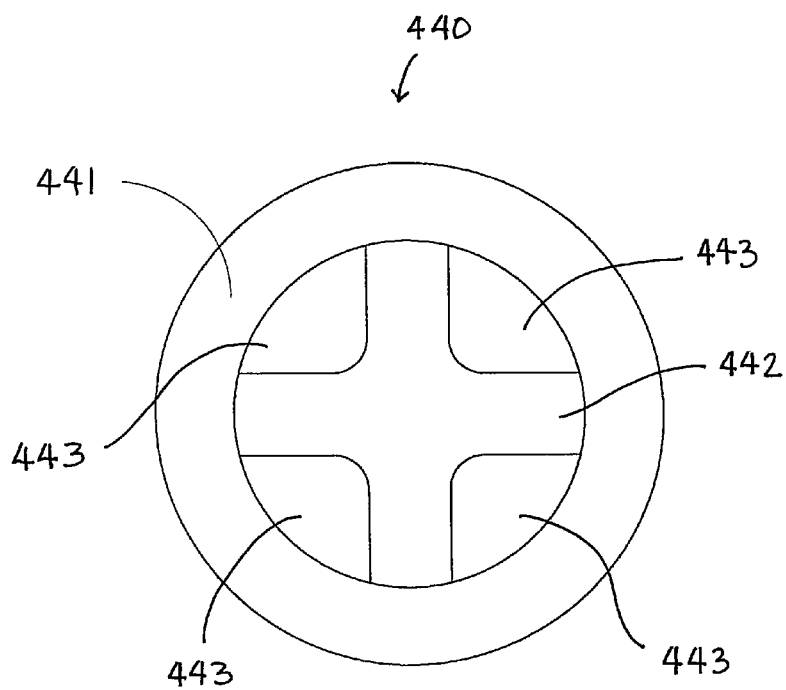
Figure 4C:
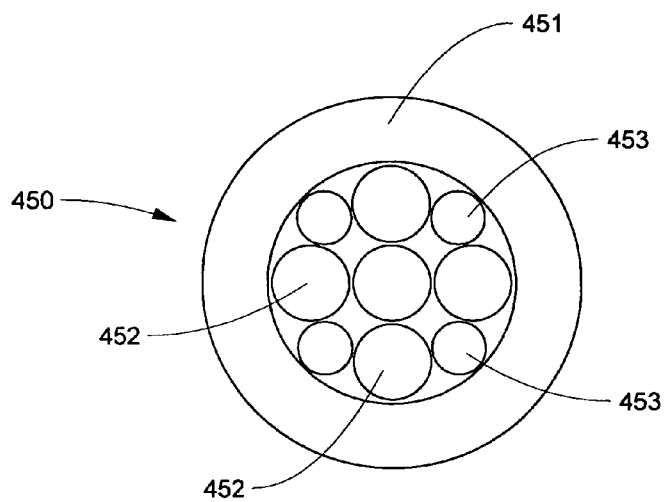
Figure 4D:
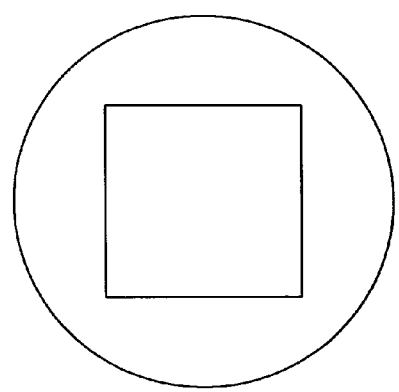
Figure 5A:
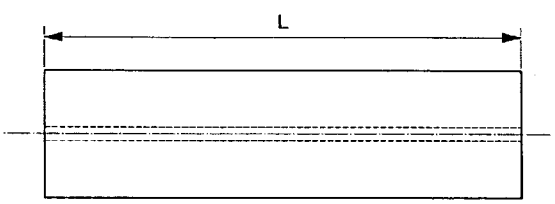
FIGS. 5 (a)-(d) are embodiments of blanks showing examples of the different configurations of coolant channels, such as a straight single coolant channel (FIG. 5(a)); two straight channels (FIG. 5(b)); two helical or spiral channels (FIG. 5(c)); and three helical or spiral channels (FIG. 5(d))
Figure 5B:
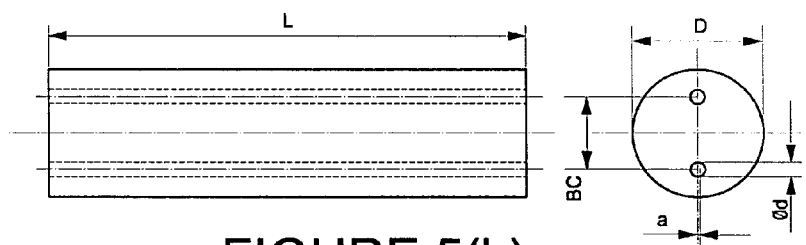
Figure 5C:
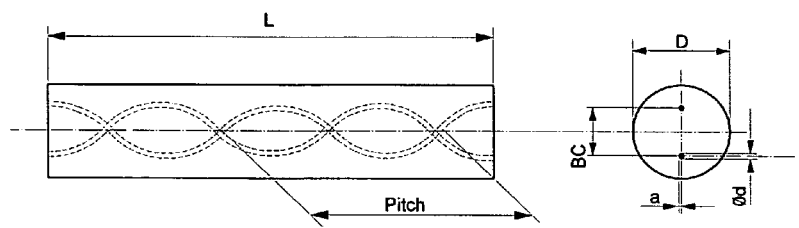
Figure 5D:
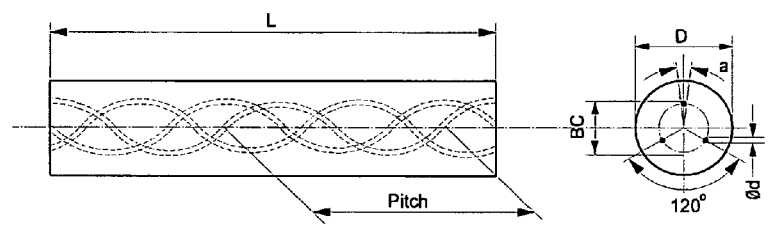

FIGS. 4(b) and 4(c) show additional embodiments of the present invention. These embodiments may additionally comprise channels, such as coolant channels. The embodiment of FIG. 4(b) comprises a tube with internal regions of different cemented carbide grades. In this example, the rod 440 comprises an outer region 441 of a first cemented carbide, a first inner region 442 of a second cemented carbide, and an additional inner regions 443 that could comprise the same or different cemented carbides. As shown in FIG. 4(c), the rod 440 could be produced, for example, by coextrudinq a set 450 comprising a tube 451 filled with rods 452 and 453. Rods 452 may be formed from a cemented carbide that has at least one characteristic that differs from the rods 453, for example.

By way of example only, an additional embodiment of a rotary tool of the present invention is shown in FIG. 5. FIG. 5 depicts a step drill 110 constructed according to the present invention. The drill 110 includes a cutting portion 112 including several helically oriented cutting edges 114. The drill 110 also includes a mounting portion 116 that is received by a chuck to mount the drill to a machine tool (not shown). The drill 110 is shown in partial cross-section to reveal three regions of cemented carbide materials that differ relative to one another with regard to at least one characteristic. A first region 118 is disposed at the cutting tip of the drill 110. The cemented carbide material from which region 118 is composed exhibits an enhanced wear resistance and hardness relative to a central region 120 forming the core of the drill 110. The core region is of a cemented carbide material that exhibits an enhanced modulus of elasticity relative to the remaining two regions. The enhanced modulus of elasticity reduces the tendency of the drill 110 to bend as it is forced into contact with a work piece. The drill also includes an outer region 122 that defines the several helically oriented cutting edges 114. The outer region surrounds and is coaxially disposed relative to the core region 120. The outer region 122 is composed of a cemented carbide material that exhibits enhanced hardness and wear resistance relative to both the core region 120 and the tip region 118. The cutting surfaces 114 that are defined by the outer region 122 experience faster cutting speeds than cutting regions proximate to the drill's central axis. Thus, the enhanced wear resistance and hardness of the outer region 122 may be selected so that uniformity of wear of the cutting surfaces is achieved.

Embodiments of the present invention also include additional methods of making composite cemented carbide articles. Embodiments include a method of forming a composite article by coextruding at least two composite materials comprising cemented carbides to form a green compact. The coextruding may be performed by direct or indirect extrusion process. The feed chamber of the extruder is filled with two grades of materials, such as two grades of carbide powder and binder powder mixed with a plastic binder. The plastic binder material may be present in concentrations from about 33 wt. % to 67 wt. % and decreases the viscosity of the powder metal mixture to allow extrusion.

The extrusion process for cemented carbides is well known in the art. In a typical extrusion process, metal powders are mixed with a plastic binder. Any typical plastic binder may be used such as plastic binders based upon benzyl alcohol, cellulose, polymers, or petroleum products. Typically, a high sheen mixing process is used to ensure intimate contact between the metal powders and the plastic binder.

The metal/binder mixer may then be pumped by screw feeder through the extruder to produce an extruded product. Embodiments of the method of the present invention include coextrusion of at least two cemented carbide grades. The term coextrusion, as used herein, means that two materials are extruded simultaneously to form a single article incorporating both materials. Any coextrusion process may be used in the method of the present invention such as, pumping two grades of cemented carbide to separate sections of funnel or die wherein the two grades exit the die in intimate contact with each other.

Figure 6A:
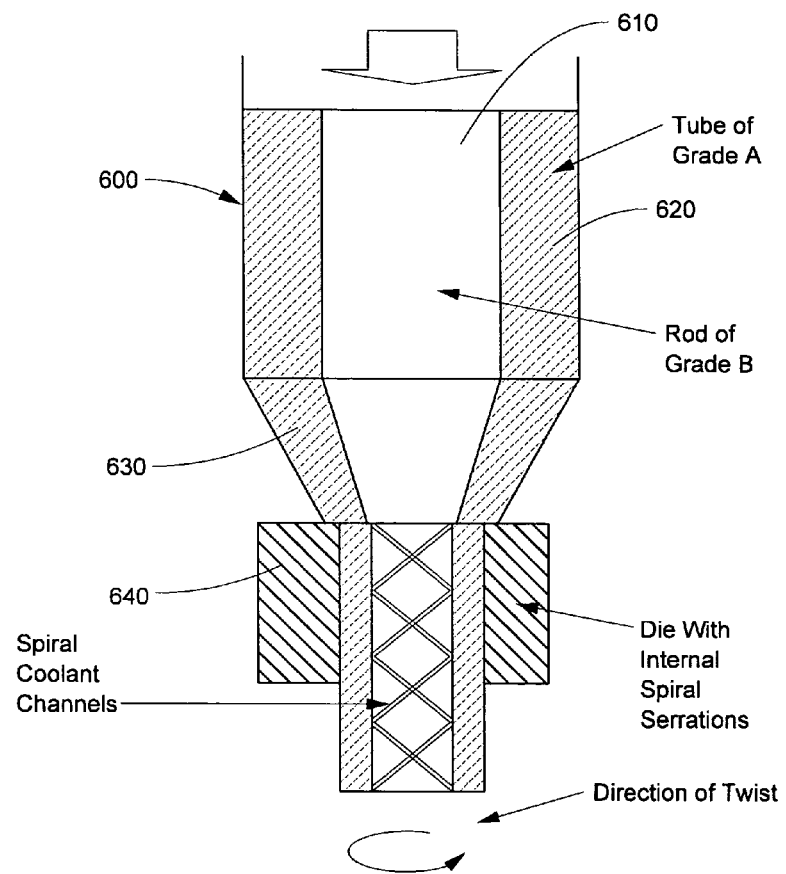
FIG. 6(a) is a representation of the coextrusion pressing apparatus used in coextrusion of a tube of grade A and a rod of grade B through a die with internal spiral serrations to produce a blank with helical or spiral channels.

An embodiment of the coextrusion process is shown in FIG. 6(a). The feed chamber 600 is filled with a rod 610 of a first grade of cemented carbide powder and a tube 620 of a second grade of cemented carbide powder. The rod 610 and the tube 620 were individually formed by separate extrusion processes as known in art. In certain embodiments, the tube 620 may be extruded directly into the feed chamber 600. The rod 610, formed in a separate extrusion process may then be inserted into the tube 620 already in the feed chamber 600.

In this embodiment of the extrusion process, a plunger (not shown) pushes the rod 610 and the tube 620 through the feed chamber and into the funnel 630. The funnel 630 reduces in cross-sectional area from the feed chamber to the die 640. The funnel 630 causes compaction and consolidation of the cemented carbide powders resulting in intimate contact between the rod 610 and tube 620 and formation of a green compact ("extruded material").

Figure 6B:
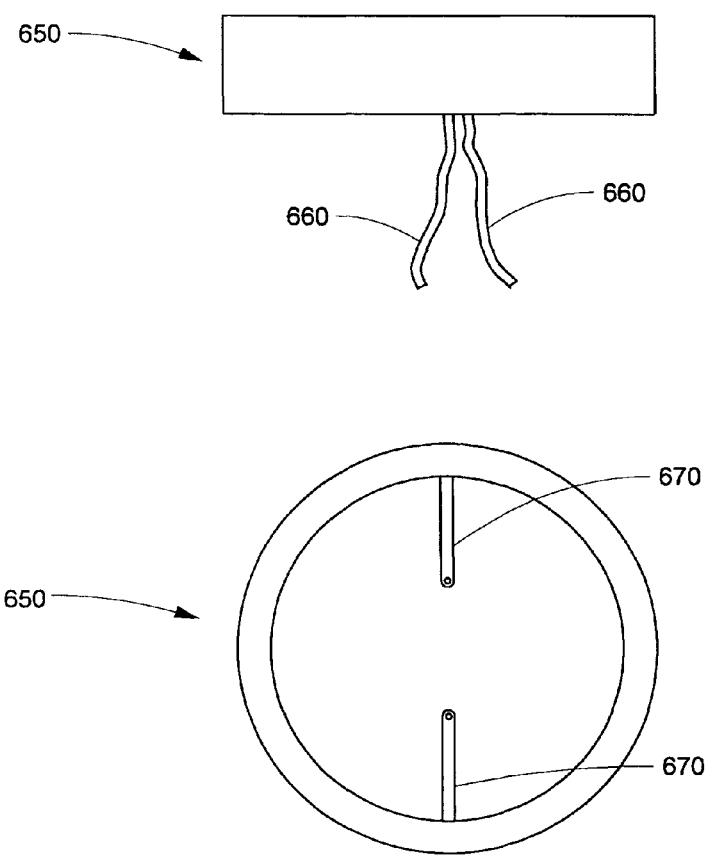
FIG. 6(b) is a representation of a channel die.

In certain embodiments, the extrusion process may also include a channel die 650 (see FIG. 6(b)) incorporated between the funnel 630 and the die 640. The channel die comprises two wires 660 or the channel die may comprise other means for making internal channels in the green compact. The wires 660 are connected to arms 670 which hold the wires 660 so they may contact the extruded material. The wires 660 result in the formation of channels in the extruded material. The wires 660 may be made from any material capable of forming channels in the extruded material, such as, but not limited to, nylon, polymer coated metal wire, polyethylene, high density polyethylene, polyester, polyvinyl chloride, polypropylene, an aramid, Kevlar, polyetheretherketone, natural materials, cotton, hemp, and jute. Preferably in certain applications, such as for formation of helically oriented channels, the wire is a flexible wire. However, for linearly oriented channels and in some helical applications, rigid wires may be used. The channels may be used as coolant channels in rotary tools. The wires 660 may be used to form helically oriented channels, linearly oriented channels, or a combination thereof. FIGS. 5(a)-(d) depict embodiments of blanks showing examples of the different configurations of coolant channels, such as a straight single coolant channel (FIG. 5(a)); two straight channels (FIG. 5(b)); two helical or spiral channels (FIG. 5(c)); and three helical or spiral channels (FIG. 5(d)). A cross-section of the wire or other channel making component may be any shape, such as round, elliptical, triangular, square, and hexagonal.

Figure 6C:
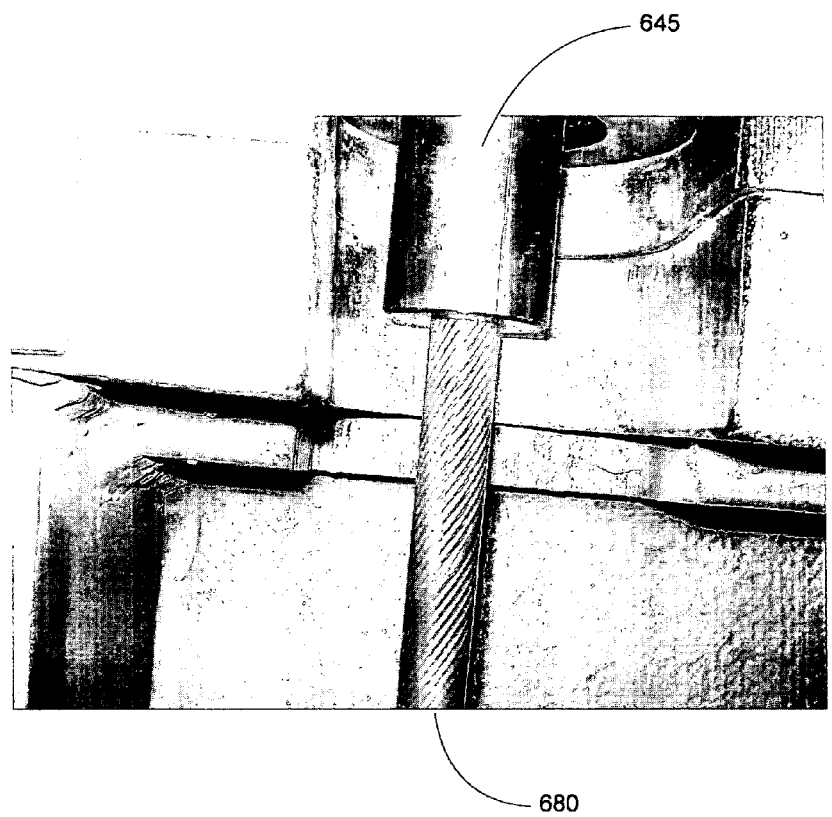
FIG. 6(c) is a photograph of a coextruded composite cemented carbide rod with internal channels exiting from a die with spiral serrations.

Helically oriented channels may be formed in the extruded material in embodiments where the extruded material rotates relative to the channel die 650. The extruded material may be rotated by incorporating spiral serrations in the die 640 (see FIG. 6(a)). In FIG. 6(c), extruded material 680 exits die 645 that includes helical serrations on the internal surface of the die 645. As the extruded material passes over the serrations, the extruded material is caused to rotate relative to the channel die (not shown). Alternatively, the die may rotate to cause the extruded material to rotate relative to the channel die. Other channel dies may be used, such dies comprising fixed helical coils wherein the extruded material is cause to rotate relative to the channel die in the same rotation as the helical coils, or any other channel forming means.

The channel die may be a separate component or may be integral to the funnel, die, or other component in the extrusion system. The channel die may be capable of making at least one channel in the extruded material. The number and size of the channels may be limited by the size of the extruded material, the size of the channels, and the application for the ultimate use of the extruded material. In embodiments comprising a channel die comprising wires, the number of wires will correspond to the number of channels formed in the extruded material. For an rotary tool application, it may be preferable to have an equal number of channels as there will be flutes for example.

Embodiments of the present invention may further include loading the feed chamber with at least two cemented carbide grades. At least one cemented carbide grade loaded in the feed chamber may be an extruded form of either a rod, tube, bar, strips, rectangles, gear profiles, star shapes, or any other shape that may be formed in an extrusion process. In rotary tool or roller applications, it may be preferable that at least one of the two cemented carbide grades be in the form of a rod shape and at least one cemented carbide in a shape of a tube. In other applications, the feed chamber may be filled with multiple tubes and/or multiple rods of different cemented carbide grades. If multiple rods are used, the extruded material may be formed with specific grades of cemented carbides in specific regions or randomly distributed throughout the cross-section of the extruded material.

A further embodiment of the present invention may comprise extruding a cemented carbide grade to form an extruded green compact and pressing the extruded green compact with a second cemented carbide grade to form a pressed green compact. The extruded green compact may optionally comprise internal channels formed as described above, for example.

Figure 7:
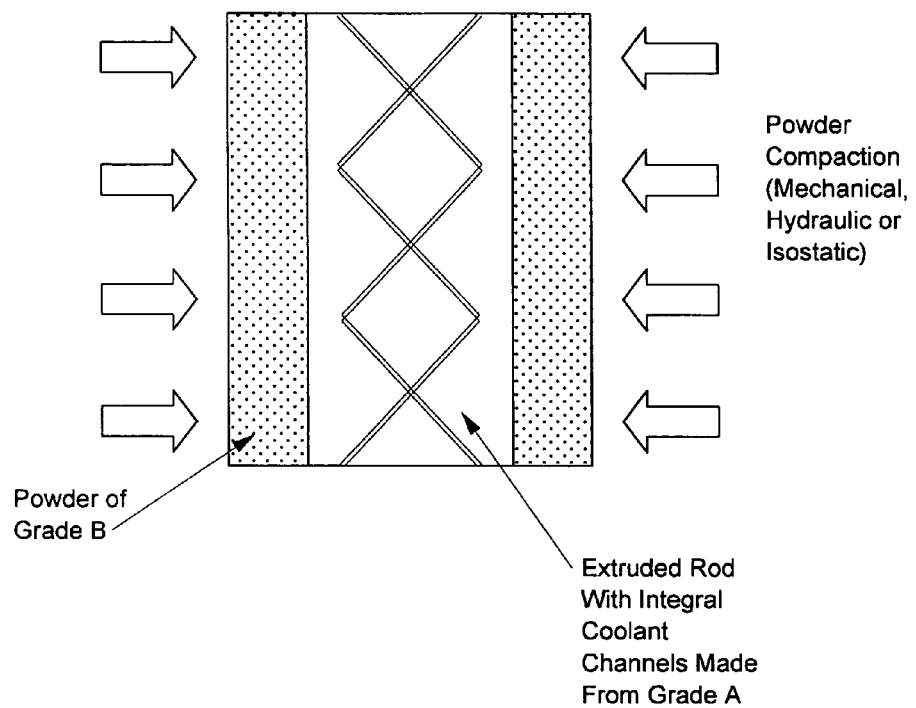
FIG. 7 is representation of a dry bag isostatic pressing apparatus used in an embodiment of a method of the present invention including consolidating cemented carbide grade B with an extruded rod with internal channels made from a cemented carbide grade A.

FIG. 7 is representation of a dry bag isostatic pressing apparatus used in an embodiment of a method of the present invention including consolidating cemented carbide grade B with an extruded rod with internal channels made from a cemented carbide grade A. The figure depicts powder compaction of an outer cemented carbide grade onto the extruded rod including integral coolant holes.

Figure 8A:
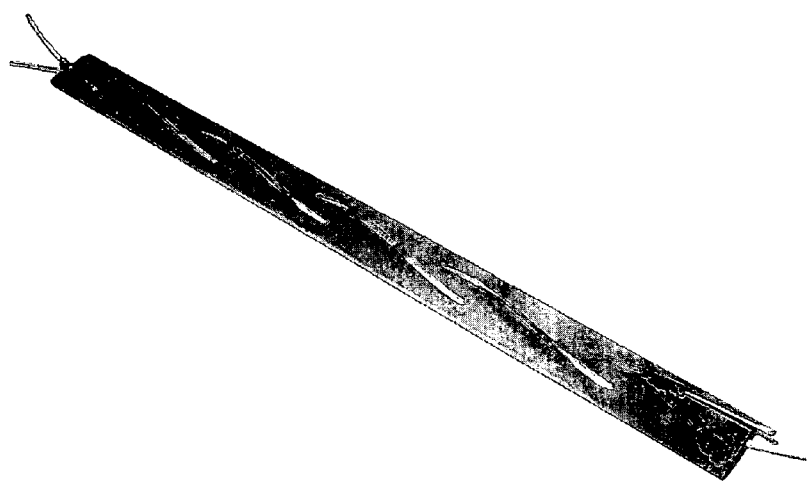
FIG. 8(a) is a photograph of a longitudinal cross-section of a composite rod with internal coolant channels of the present invention, the nylon wires in the photograph have been inserted in the channels to more clearly show their location and the path of the coolant channels.
Figure 8B:
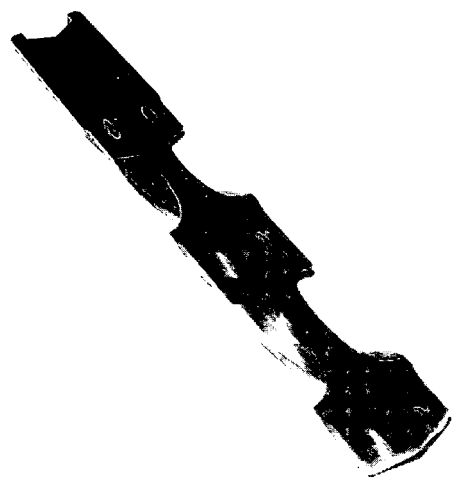
FIG. 8(b) is a photograph of a longitudinal cross-section of a drill made from a composite cemented carbide having internal coolant channels.
Figure 9:
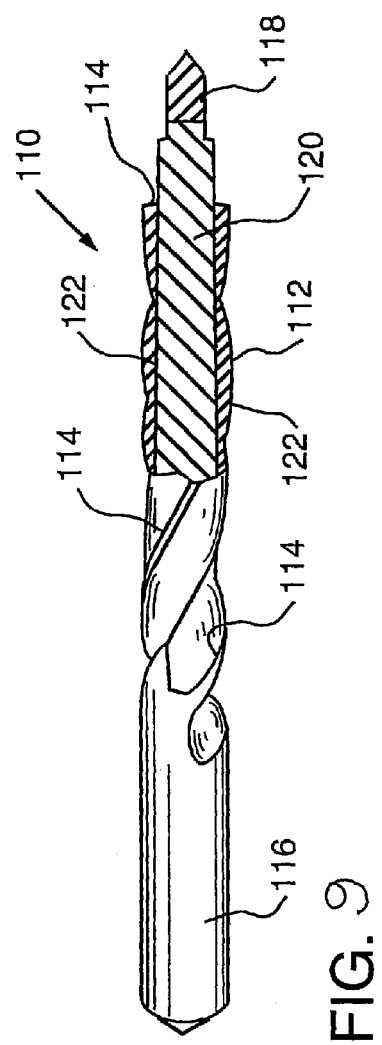
FIG. 9 is a partial cut-away plan view of an embodiment of a step drill constructed according to the present invention.
Figure 10:
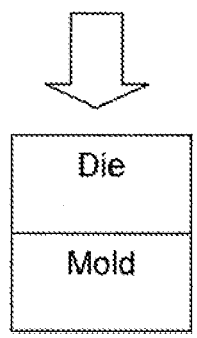
FIG. 10 is a representation of the injecting molding apparatus according to one embodiment of a method of the present invention.

FIG. 8(a) is a photograph of a longitudinal cross-section of a composite rod with internal coolant channels of the present invention, wherein the nylon wires in the photograph have been inserted in the channels to more clearly show their location and the path of the coolant channels. FIG. 8(*b*) is a photograph of a longitudinal cross-section of a drill according to the invention made from a composite cemented carbide having internal coolant channels.

The present invention is generally directed to methods of forming articles, such as tool blanks, having a composite construction including regions of differing composition and/or microstructure. An embodiment of the method includes injection molding of articles having a composite construction including regions of differing composition and/or microstructure. The method of the present invention finds general application in the production of rotary tools and may be applied in, for example, the production of cemented carbide rotary tools used in material removal operations such as drilling, reaming, countersinking, counter boring, and end milling.

The present invention is directed to methods of forming an article comprising, comprising an injecting at least two composite materials comprising metal carbides into a mold to form a green compact. The composite materials may be as described above. The injecting at least two composite materials may be performed through a die and, in certain embodiments, the die may comprise means for making internal channels in the green compact. As described above, the die may comprise at least one wire to form an internal channel within the green compact, wherein the wire may be rigid or flexible. The die for making internal channels may be used in combination with a die or mold that has helical serrations causing the composite material to twist as it enters the mold. In certain embodiments, the mold may be partially filled with at least one composite material or other component prior to the injecting the composite material into the mold.

In one embodiment, the method comprises mixing powdered metals with a plastic binder to form the composite material prior to injecting the composite material into the mold. The plastic binder material may be present in concentrations from about 25 vol. % to 75 vol. % and decreases the viscosity of the powder metal mixture to facilitate injection.

The primary difference between extrusion and injection molding is that while extrusion may be considered a continuous process for one batch (with material continuously entering at one end of the die and leaving the other end), injection molding comprises stopping the process when the mold is filled. Generally, an injection molding method is a technique for making more complex articles. Cemented carbides mixed with a plastic binder are injected at high pressure into a mold. The mold is the inverse of the desired shape. Molds are typically made from metal, usually either steel or aluminum, but may be carbon, or other heat resistant material, if the green compact is to be heat treated, for example by sintering or presintering, in the mold and optionally may be further machined to form or refine the features of the desired part.

The design of molded parts and their molds is carefully considered to ensure that the injection molded part may be released from the mold, that the molds can be completely filled and the composite material densified, and to compensate for material shrinkage due to plastic binder removal and normal sintering shrinkage.

Molds typically comprise at least two parts to permit the part to be extracted. Complex parts are formed using more complex molds, which may require moveable sections, called slides, which are inserted into the mold to form particular features that cannot be formed using only two parts, but are then withdrawn to allow the part to be released. Some molds allow previously molded parts to be re-inserted to allow a new plastic layer to form around the first part. The molds of the present invention may be simple or complex and may incorporate many features, such as steps such as rods having sections of different radii, flutes, shanks, keys, holes, edges, etc.

In embodiments of the method, the blended metal powders are intimately mixed with a plastic binder and forced under pressure into a mold cavity. The powdered metal may be placed into a feed hopper, a large open bottomed container, which feeds the metal into a screw. A hydraulic or electric motor rotates the screw feeding the pellets through the screw. As the screw rotates, the pellets are moved forward in the screw undergoing increasing pressure and friction which causes heating and compaction of the powdered metal.

Although the present invention has been described in connection with certain embodiments, those of ordinary skill in the art will, upon considering the foregoing description, recognize that many modifications and variations of the invention may be employed. All such variations and modifications of the present invention are intended to be covered by the foregoing description and the following claims.

We claim:
1. A method of forming an elongate generally cylindrical article, the method comprising:
injecting at least two different composite materials comprising metal carbides through a die into a mold to form a green compact, wherein at least one of the composite materials includes less than 5 weight percent cubic carbides, with the proviso that the weight percent cubic carbides is not zero; and
wherein the die comprises at least one element forming at least one internal channel within the green compact.
2. The method of claim 1, wherein the die comprises at least one wire forming an internal channel within the green compact.
3. The method of claim 2, wherein the die comprises at least two wires, wherein each wire forms an internal channel within the green compact.
4. The method of claim 3, wherein the die comprises three wires, wherein each wire forms an internal channel within the green compact.
5. The method of claim 2, wherein the at least one wire is a flexible wire.
6. The method of claim 5, wherein the flexible wire comprises at least one of nylon, a polymer coated metal wire, polyethylene, high density polyethylene, polyester, polyvinyl chloride, polypropylene, an aramid, Kevlar, polyetheretherketone, cotton, animal gut, hemp and jute.
7. The method of claim 2, wherein the at least one wire is an inflexible wire.
8. The method of claim 7, wherein the inflexible wire comprises a metal.
9. The method of claim 1, the method further comprising:
loading each of the different composite materials into a feed chamber.
10. The method of claim 1, wherein the at least two composite materials are powder metal precursors to cemented carbides.
11. The method of claim 1, wherein the green compact comprises two cemented carbide grades and the cemented carbide grades are coaxially disposed.
12. The method of claim 10, wherein the at least two composite materials are injected through a rotating die.
13. The method of claim 10, wherein the green compact comprises at least one channel.
14. The method of claim 10, wherein the green compact comprises two helical channels.
15. A method of forming an elongate generally cylindrical article, the method comprising:

injecting at least two different powdered materials through a die into a mold to form a green compact, wherein each powdered material is a precursor to a cemented carbide, wherein at least one of the at least two different powdered materials includes less than 5 weight percent cubic carbides, with the proviso that the weight percent cubic carbides is not zero, and wherein the different powdered materials are in different regions of the green compact;

wherein the die comprises at least one element forming at least one internal channel in the green compact.

16. The method of claim 15, wherein the die comprises at least one wire and the at least one wire forms an internal channel in the green compact.

17. The method of claim 15, wherein the article is selected from a rotary cutting tool blank, a rotary cutting tool, and a rod.

18. The method of claim 15, wherein the article is a rotary cutting tool selected from a drill, an end mill, a reaming tool, a countersinking tool, a counterboring tool, and a tapping tool.

19. The method of claim 15, wherein the die comprises at least two wires, and each wire forms an internal channel within the green compact.

20. The method of claim 16, wherein the at least one wire is a flexible wire.

21. The method of claim 20, wherein the at least one flexible wire comprises at least one of nylon, a polymer coated metal wire, polyethylene, high density polyethylene, polyester, polyvinyl chloride, polypropylene, an aramid, Kevlar, polyetheretherketone, cotton, animal gut, hemp, and jute.

22. The method of claim 16, wherein the at least one wire is an inflexible wire.

23. The method of claim 22, wherein the at least one inflexible wire comprises a metal.

24. The method of claim 15, wherein the green compact comprises two powdered materials that are coaxially disposed.

25. The method of claim 15, wherein the die is a rotating die.

26. The method of claim 15, wherein the green compact comprises at least one channel.

27. The method of claim 15, wherein the green compact comprises two helical channels.

28. The method of claim 1, wherein the at least two different composite materials comprise three different composite materials.

29. The method of claim 28, wherein the three different composite materials are powder metal precursors to cemented carbides.

30. The method of claim 28, wherein one of the three different composite materials comprises a previously molded part.

31. The method of claim 28, wherein the green compact comprises three cemented carbide grades.

32. The method of claim 31, wherein the green compact comprises an outer region comprising the first cemented carbide grade, a first inner region comprising the second cemented carbide grade, and a second inner region comprising the third cemented carbide grade.

33. The method of claim 31, wherein the green compact comprises a tip comprising the first cemented carbide grade, an inner region comprising the second cemented carbide grade, and an outer region comprising the third cemented carbide grade.

34. The method of claim 31, wherein the green compact comprises a mounting portion comprising the first cemented carbide grade, an inner region comprising the second cemented carbide grade, and an outer region comprising the third cemented carbide grade.

35. The method of claim 2, wherein the at least one wire forms an internal channel in the green compact intersecting at least two regions of the green compact.

36. The method of claim 2, wherein the at least one wire forms an internal channel in the green compact intersecting an outer region and a core region of the green compact.

37. The method of claim 1, wherein the at least one of the composite materials includes from 3 to less than 5 weight percent cubic carbides.

38. The method of claim 1, wherein the article is selected from a rotary cutting tool blank, a rotary cutting tool, and a rod.

39. The method of claim 1, wherein the article is a rotary cutting tool selected from a drill, an end mill, a reaming tool, a countersinking tool, a counterboring tool, and a tapping tool.

* * * * *

UNITED STATES PATENT AND TRADEMARK OFFICE
CERTIFICATE OF CORRECTION

| | | |
|---|---|---|
| PATENT NO. | : 8,318,063 B2 | Page 1 of 1 |
| APPLICATION NO. | : 11/585408 | |
| DATED | : November 27, 2012 | |
| INVENTOR(S) | : Mirchandani et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 496 days.

Signed and Sealed this
Twenty-sixth Day of August, 2014

Michelle K. Lee
*Deputy Director of the United States Patent and Trademark Office*